US012096060B2

(12) United States Patent
Voytenko et al.

(10) Patent No.: US 12,096,060 B2
(45) Date of Patent: Sep. 17, 2024

(54) METHODS AND APPARATUS TO GENERATE AUDIENCE METRICS

(71) Applicant: The Nielsen Company (US), LLC, New York, NY (US)

(72) Inventors: Denis Voytenko, Oldsmar, FL (US); Inh Jee, Chicago, IL (US); Meghan LePage Beeman, Franklin, TN (US); Paul Chimenti, Tampa, FL (US); David J. Kurzynski, South Elgin, IL (US); Naveen Kumar Vakati, Odessa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 91 days.

(21) Appl. No.: 17/541,966

(22) Filed: Dec. 3, 2021

(65) Prior Publication Data
US 2022/0182698 A1 Jun. 9, 2022

Related U.S. Application Data

(60) Provisional application No. 63/121,841, filed on Dec. 4, 2020.

(51) Int. Cl.
*H04N 21/25* (2011.01)
*H04N 21/258* (2011.01)
*H04N 21/643* (2011.01)

(52) U.S. Cl.
CPC ..... *H04N 21/25883* (2013.01); *H04N 21/252* (2013.01); *H04N 21/25891* (2013.01); *H04N 21/64322* (2013.01)

(58) Field of Classification Search
CPC .................................................. H04N 21/20
See application file for complete search history.

(56) References Cited

U.S. PATENT DOCUMENTS

| 6,108,637 | A  | 8/2000  | Blumenau       |
| 7,039,931 | B2 | 5/2006  | Whymark        |
| 8,234,151 | B1 | 7/2012  | Pickton et al. |
| 8,297,977 | B2 | 10/2012 | Freund         |

(Continued)

OTHER PUBLICATIONS

U.S. Appl. No. 15/338,301, filed Oct. 28, 2016, 68 Pages.
(Continued)

*Primary Examiner* — Mushfikh I Alam

(57) ABSTRACT

Methods, apparatus, systems, and articles of manufacture are disclosed to generate audience metrics. An example apparatus includes online panel factor generator circuitry to generate an online panel adjustment factor based on television panel data and online panel data; over-the-top (OTT) factor generator circuitry to generate an OTT adjustment factor based on the television panel data and a portion of the online panel data, the portion of the online panel data corresponding to OTT panel data; independence probability factor generator circuitry to generate an independence probability adjustment factor; and a convergence circuitry to: generate an aggregated adjustment factor based on the online panel adjustment factor, the OTT adjustment factor, and the independence probability adjustment factor; and generate a deduplicated reach corresponding to a media item based on a comparison of the aggregated adjustment factor to historical data.

20 Claims, 16 Drawing Sheets

(56) References Cited

U.S. PATENT DOCUMENTS

| | | |
|---|---|---|
| 8,327,396 B2 | 12/2012 | Ramaswamy et al. |
| 8,364,516 B2 | 1/2013 | Anderson et al. |
| 8,370,489 B2 | 2/2013 | Mazumdar et al. |
| 8,874,652 B1 | 10/2014 | Pecjak et al. |
| 8,930,701 B2 | 1/2015 | Burbank et al. |
| 8,935,713 B1 | 1/2015 | Gabel et al. |
| 8,973,023 B1 | 3/2015 | Rao et al. |
| 9,122,694 B1 | 9/2015 | Dukes et al. |
| 9,129,214 B1 | 9/2015 | Gomez-Uribe et al. |
| 9,159,095 B1 | 10/2015 | Smith |
| 9,237,138 B2 | 1/2016 | Bosworth et al. |
| 9,253,550 B1 | 2/2016 | Smith |
| 9,286,621 B2 | 3/2016 | Dubey et al. |
| 9,292,856 B1 | 3/2016 | Niederstrasser et al. |
| 9,313,294 B2 | 4/2016 | Perez et al. |
| 9,674,567 B1 | 6/2017 | Carter |
| 9,852,163 B2 | 12/2017 | Srivastava et al. |
| 9,872,083 B2 | 1/2018 | Francis et al. |
| 9,980,010 B2 | 5/2018 | Ray et al. |
| 10,313,752 B2 | 6/2019 | Nagaraja Rao et al. |
| 10,445,766 B1 | 10/2019 | Barbier et al. |
| 11,558,667 B2 | 1/2023 | Nagaraja Rao et al. |
| 2009/0292587 A1 | 11/2009 | Fitzgerald |
| 2009/0307084 A1 | 12/2009 | Monighetti et al. |
| 2011/0288907 A1 | 11/2011 | Harvey et al. |
| 2012/0245400 A1 | 9/2012 | Clark et al. |
| 2013/0013372 A1 | 1/2013 | Gomez Uribe et al. |
| 2013/0145022 A1 | 6/2013 | Srivastava et al. |
| 2013/0268351 A1 | 10/2013 | Abraham et al. |
| 2014/0122703 A1* | 5/2014 | Pugh .................. H04L 67/02 709/224 |
| 2014/0278914 A1 | 9/2014 | Gurumoorthy et al. |
| 2014/0317114 A1 | 10/2014 | Alla et al. |
| 2015/0095138 A1 | 4/2015 | Rao et al. |
| 2015/0201031 A1 | 7/2015 | James et al. |
| 2015/0332317 A1 | 11/2015 | Cui et al. |
| 2016/0027037 A1 | 1/2016 | Cai et al. |
| 2016/0119689 A1 | 4/2016 | Hood et al. |
| 2016/0269783 A1 | 9/2016 | Mowrer et al. |
| 2017/0034591 A1 | 2/2017 | Ray et al. |
| 2017/0034592 A1 | 2/2017 | Ray et al. |
| 2017/0034593 A1 | 2/2017 | Ray et al. |
| 2017/0091810 A1 | 3/2017 | McGovern et al. |
| 2017/0127110 A1 | 5/2017 | Chaar et al. |
| 2017/0155956 A1* | 6/2017 | Nagaraja Rao .. H04N 21/44226 |
| 2017/0180798 A1* | 6/2017 | Goli .................... H04N 21/2407 |
| 2017/0187478 A1* | 6/2017 | Shah ................. H04N 21/8456 |
| 2018/0098119 A1* | 4/2018 | Overcash ........... H04N 21/6587 |
| 2019/0289363 A1 | 9/2019 | Nagaraja Rao et al. |
| 2020/0145720 A1* | 5/2020 | Krauss ................. H04N 21/812 |
| 2020/0322687 A1* | 10/2020 | Schneider .......... H04N 21/4758 |
| 2020/0328955 A1* | 10/2020 | Kurzynski ......... H04N 21/6582 |
| 2021/0105541 A1 | 4/2021 | Ray et al. |

OTHER PUBLICATIONS

United States Patent and Trademark Office, "Final Office Action," issued Aug. 5, 2020 in connection with U.S. Appl. No. 16/428,032, 17 pages.

United States Patent and Trademark Office, "Final Office Action," issued May 18, 2020 in connection with U.S. Appl. No. 16/428,032, 15 pages.

United States Patent and Trademark Office, "Non-Final Office Action," issued Dec. 31, 2019 in connection with U.S. Appl. No. 16/428,032, 13 pages.

United States Patent and Trademark Office, "Non-Final Office Action," issued in connection with U.S. Appl. No. 15/363,877, dated Jan. 12, 2018, 18 pages.

* cited by examiner

METHODS AND APPARATUS TO GENERATE AUDIENCE METRICS

RELATED APPLICATION

This patent application claims the benefit of U.S. Provisional Patent Application No. 63/121,841, which was filed on Dec. 4, 2020. U.S. Provisional Patent Application No. 63/121,841 is hereby incorporated herein by reference in its entirety. Priority to U.S. Provisional Patent Application No. 63/121,841 is hereby claimed.

FIELD OF THE DISCLOSURE

This disclosure relates generally to total content ratings and, more particularly, to methods and apparatus to generate audience metrics.

BACKGROUND

Tracking user access to media has been used by broadcasters and advertisers to determine viewership information for the media. Tracking viewership of media can present useful information to broadcasters and advertisers when determining placement strategies for advertising. The success of advertising placement strategies is dependent on the accuracy that technology can achieve in generating audience metrics.

BRIEF DESCRIPTION OF THE DRAWINGS

The figures are not to scale. In general, the same reference numbers will be used throughout the drawing(s) and accompanying written description to refer to the same or like parts.

Figure 1:
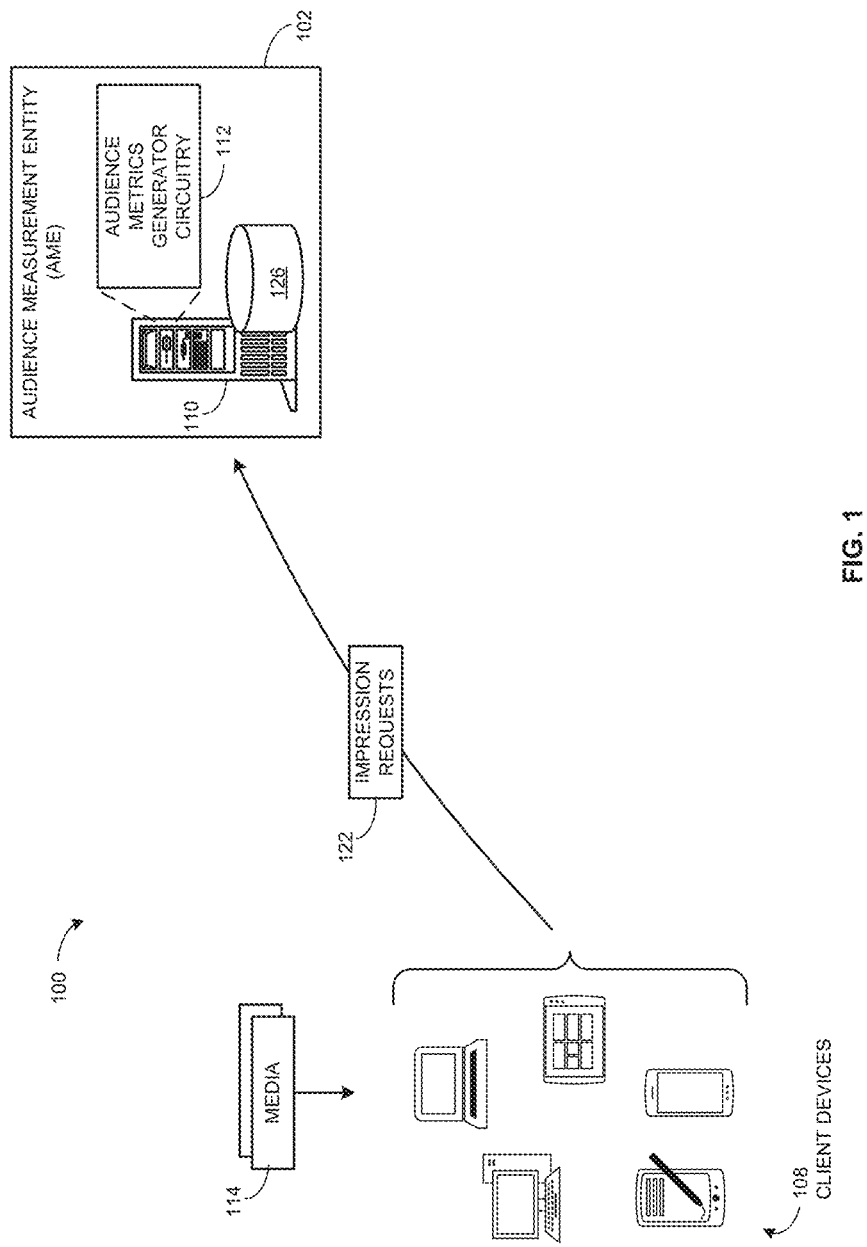
FIG. 1 is an example system for logging impressions of media accessed via client devices.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as digital television (DTV) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client device requests the media, both the media and the monitoring instructions are downloaded to the client device. The monitoring instructions are, thus, executed whenever the media is accessed, be it from a server or from a cache. Upon execution, the monitoring instructions cause the client device to send or transmit monitoring information from the client device to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client device and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when the subscribers visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mazumdar et al., U.S. Pat. No. 8,370,489, which is incorporated herein by reference in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from client devices (who may not be a member of an audience measurement panel and, thus, may be unknown to the AME) by redirecting the client devices from the AME to a database proprietor, such as a social network site partnered with the AME, using an impression response. Such a redirection initiates a communication session between the client device accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client device to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, DTV media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. Reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is used to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

Notably, although third-party cookies are useful for third-party measurement entities in many of the above-described techniques to track media accesses and to leverage demographic information from third-party database proprietors, use of third-party cookies may be limited or may cease in some or all online markets. That is, use of third-party cookies enables sharing anonymous PII subscriber information across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped) supporting third-party cookies. This will make it more challenging for third-party measurement entities to track media accesses via first-party servers. That is, although first-party cookies will still be supported and useful for media providers to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets are generated.

Audience measurement entities (AMEs) may use TV and digital media measurements to monitor audiences of media. In examples disclosed herein, digital media (DM) measurements are measurements representative of media accesses from digital platforms by a panel of audience members. An example digital media measurement is a Digital Content Rating (DCR) which represents a measurement of audience accesses to digital media. In examples disclosed herein, DM audiences are audiences representative of audience members that access media from digital platforms (e.g., TV, mobile, desktop, etc.). In many cases, a single unique audience member may be exposed to an item of media via more than one platform (e.g., a TV platform and a digital device platform), thus creating an overlap between TV and digital measurements. As used herein, an audience overlap is based on audience members belonging to one or more audiences. For example, a particular audience member can be exposed to a particular media as TV media on a first device type (e.g., a TV) and as digital media on a second device type (e.g., a mobile device). Thus, this contributes to an audience overlap between the TV audience and the mobile device audience (e.g., a DM audience) of one audience member.

Deduplication is a process that is used to adjust cross-platform media exposures deduplicating multiple logged impressions attributed to the same audience member so that an individual audience member exposed to the same media via more than one platform is counted only once for purposes of determining a unique audience (e.g., a deduplicated audience). A unique audience can then be used to determine the reach of the media. Prior techniques to determine unique audience sizes and demographic distributions of audiences of media involve AMEs using third-party cookies to leverage demographic impression information logged by database proprietors based on media accessed by subscribers of those database proprietors. However, measurements based on such third-party cookies may be limited or may cease in some or all online markets.

Examples disclosed herein may be used to collect impressions information from multiple sources and use that information to produce a deduplicated audience reach for media. For example, the multiple sources include TV panel data and/or digital panel data. Examples disclosed herein generate adjustment factors to estimate the deduplication of the audience. For example, the adjustment factors include an online panel (OP) adjustment factor, an over-the-top (OTT) adjustment factor, an independence probability adjustment factor, an internet protocol (IP) match adjustment factor, a maximum entropy adjustment factor, and/or an identity adjustment factor. Examples disclosed herein determine weights of the adjustment factors based on historical training data to estimate a deduplicated reach for total content (RTC) measurement.

FIG. 1 shows an example operating environment 100 that includes an example AME 102 and example client devices 108. The example AME 102 includes an example AME computer 110 that implements example audience metrics generator circuitry 112 to estimate total unique audience sizes based on adjustment factors, historical data, and/or a universe audience estimate. In the illustrated example of FIG. 1, the AME computer 110 may also implement an impression monitor system to log media impressions reported by the client devices 108. In the illustrated example of FIG. 1, the client devices 108 may be TVs, stationary or portable computers, handheld computing devices, smart phones, Internet appliances, and/or any other type of device that may be connected to the Internet and capable of presenting media.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times on one or more of the client devices 108, that person is only counted once in the audience size for that media item. Audience size may also be referred to as unique audience or deduplicated audience.

As used herein, a media impression is defined as an occurrence of access and/or exposure to media 114 (e.g., an advertisement, a movie, a movie trailer, a song, a web page banner, a webpage, etc.). Examples disclosed herein may be used to monitor for media impressions of any one or more media types (e.g., video, audio, a webpage, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form.

In some examples, content providers and/or advertisers distribute the media 114 via the Internet to users that access websites and/or online television services (e.g., web-based TV, Internet protocol TV (IPTV), etc.). In some examples, the media 114 is served by media servers of the same internet domains as database proprietors. For example, the database proprietor can serve the media 114 to its corresponding subscribers via the client devices 108. Additionally or alternatively, the media source of the media 114 is a cable media service provider.

The media 114 is then presented via the client devices 108. When the media 114 is accessed by the client devices 108, the client devices 108 send impression requests 122 to the AME 102 so that the AME 102 can log census impressions in an AME audience metrics database 126. In the some examples, the AME 102 logs demographic impressions corresponding to accesses by the client devices 108 to the media 114. For example, demographic impressions are impressions logged in association with demographic information collected by the AME 102 from panelists. For example, the AME 102 may form and monitor a panel by enrolling audience members as panelists that agree to have their media access activities monitored by the AME 102. As part of the enrollment process, the AME 102 collects demographic information from the panelists so that the AME 102 can use the demographic information to log demographic information to log demographic impressions. Also, in the illustrated example of FIG. 1, the AME computer 110 logs census-level media impressions corresponding to accesses by client devices 108 to media 114 (e.g., by non-panelists). Census-level media impressions (e.g., census impressions) are impressions logged regardless of whether demographic information is known for those logged impressions.

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and episode number. When the media 114 includes advertisements, the advertisements may be individual, standalone advertisements and/or may be part of one or more ad campaigns. The advertisements of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of media monitoring (e.g., web pages, movies, television programs, etc.).

In some examples, the media 114 of the illustrated example is tagged or encoded to include monitoring or tag instructions, which are computer executable monitoring instructions (e.g., Java, java script, or any other computer language or script) that are executed by web browsers that access the media 114 via, for example, the Internet. Execution of the monitoring instructions causes the web browser to send the impression requests 122 (e.g., also referred to as tag requests) to one or more specified servers of the AME 102. As used herein, impression requests 122 are used by the client devices 108 to report occurrences of media impressions caused by the client devices accessing the media 114. In some examples, the AME 102 sets AME cookies in the client devices 108 to identify users that are enrolled in a panel of the AME 102 such that the AME 102 collects personally identifiable information (PII) of people that enroll in the panel by agreeing to having their internet activities monitored by the AME 102. In examples disclosed herein, PII can include a full name, street address, residence city and state, telephone numbers, email addresses, age, dates of birth, social security number, demographic information, and/or any other personal information provided by a panelist.

The tag requests 122 may be implemented using HTTP requests. However, whereas HTTP requests are network communications that traditionally identify web pages or other resources to be downloaded, the tag requests 122 of the illustrated example are network communications that include audience measurement information (e.g., ad campaign identification, content identifier, and/or user identification information) as their payloads. The server (e.g., the AME computer 110) to which the tag requests 122 are directed is programmed to log occurrences of impressions reported by the tag requests 122. Further examples of monitoring instructions (e.g., beacon instructions) and uses thereof to collect impression data are disclosed in U.S. Pat. No. 8,370,489 entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), an app publisher (e.g., an app store) can provide a data collector in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and causes the client device 108 to send one or more of the impression requests 122 to report the access to the media 114. In such examples, the data collector can obtain user identifiers and/or device identifiers stored in the client devices 108 and send them in the impression requests 122 to enable the AME 102 to log impressions. Further examples of using a collector in client devices to collect impression data are disclosed in U.S. Pat. No. 8,930,701 entitled "Methods and Apparatus to Collect Distributed User Information for Media Impressions and Search Terms," and in U.S. Pat. No. 9,237,138 entitled "Methods and Apparatus to Collect Distributed User Information for Media Impressions and Search Terms," both of which are hereby incorporated herein by reference in their entireties.

Figure 2:
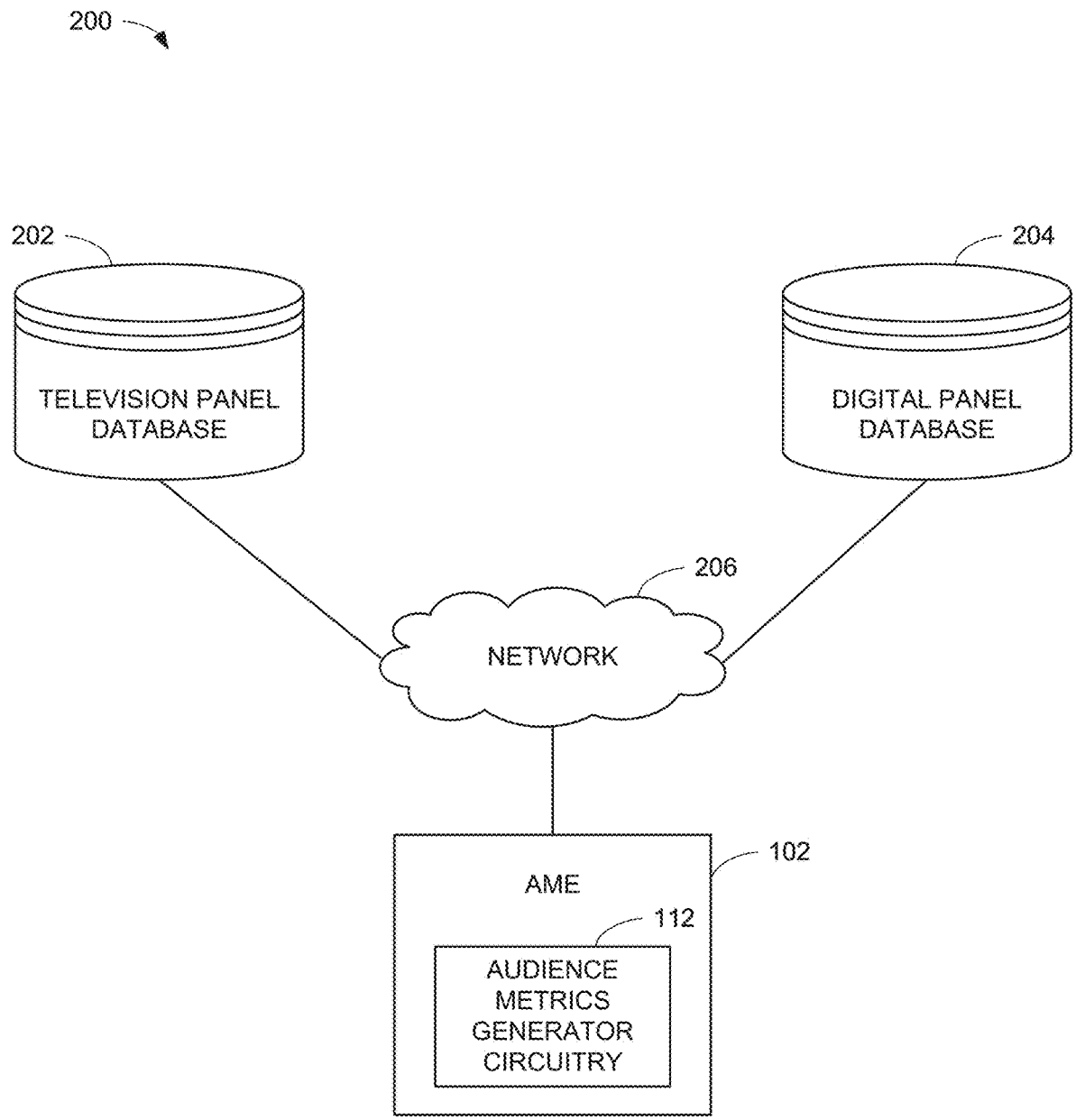
FIG. 2 is an example audience metrics system constructed in accordance with teachings of this disclosure to generate audience metrics.

FIG. 2 is an example audience metrics system 200 constructed in accordance with teachings of this disclosure to generate audience metrics. The example audience metrics system 200 includes an example TV panel database 202, an example digital panel database 204, an example network 206, and the example AME 102 (FIG. 1) that implements the example audience metrics generator circuitry 112 (FIG. 1) to de-duplicate audience impression counts and estimate audience metrics. Thus, the above discussion of like numbered components in FIG. 1 apply equally well to the like numbered parts of FIG. 2 and, to avoid redundancy, the like numbered components of FIG. 2 will not be separately described.

In the illustrated example of FIG. 2, the TV panel database 202 stores TV panelist data obtained by the AME 102 using panel meters located at panelist sites. For example, the TV panelist data can include monitoring data representative of media accessed by a panelist on a television. That is, the TV panel database 202 stores panel data including panel audience sizes. In some examples, the TV panel database 202 stores panel data for particular events. For example, the TV panel database 202 stores a panel audience size for a first TV show, a panel audience size for a second TV show, etc.

The example digital panel database 204 of the illustrated example of FIG. 2 stores digital panel data obtained by an AME. In some examples, the data stored in the digital panel database 204 corresponds to DCR measurements. For example, the digital panel database 204 can include desktop panel data, mobile panel data, OTT panel data, etc. For example, the digital panel database 204 stores an audience size corresponding to desktop impressions, an audience size corresponding to mobile impressions, etc. In some examples, the digital panel database 204 stores OTT panel data as proxy for the DM measurement to compare cross-platform (e.g., TV, mobile, desktop, etc.) duplication factors. As used herein, OTT panel data is data representing measures of media accesses via OTT devices by audience members that are enrolled in an OTT panel. As used herein, an OTT device is an Internet-connectable device that can be connected to a television or video monitor and that is operable by a user to access digital media via the Internet for playback via the television or video monitor. Such digital media may be on-demand media or broadcast media. Example OTT devices include Roku OTT devices, Amazon Fire OTT devices, etc.

In some examples, the TV panel data and the digital panel data include demographics, an entity, a time period, and a viewing state. For example, the entity can include a brand, an originator (e.g., a broadcast TV network, etc.), a program (e.g., a TV show, etc.), an episode, a distributor, etc. In some examples, the time period of the TV panel data and/or the digital panel data is a month, a year, etc. In examples disclosed herein, the viewing state represents a duration (e.g., an amount of time) an audience member was exposed to or accessed a particular media. For example, one impression can correspond to the entire duration of a TV show, 10 minutes of the TV show, etc. In some examples, the viewing state includes 0 seconds, 2 seconds, 30 seconds, etc.

The example network 206 of the illustrated example of FIG. 2 is a wide area network (WAN) such as the Internet. However, in some examples, local networks may additionally or alternatively be used. Moreover, the example network 206 may be implemented using any type of public or private network, such as, but not limited to, the Internet, a telephone network, a local area network (LAN), a cable network, and/or a wireless network, or any combination thereof.

The example audience metrics generator circuitry 112 estimates a deduplicated universe audience and media ratings. In some examples, the audience metrics generator circuitry 112 accesses and obtains panel data from the TV panel database 202 and/or the digital panel database 204. The example audience metrics generator circuitry 112 determines adjustment factors based on the panel data (e.g., TV panel data, digital panel data) to estimate a deduplicated reach. In some examples, the adjustment factors are demographic-level adjustment factors. For example, the adjustment factors represent an amount of deduplication for demographic levels (e.g., gender, age, etc.). The example audience metrics generator circuitry 112 is described below in connection with FIG. 3.

Figure 3:
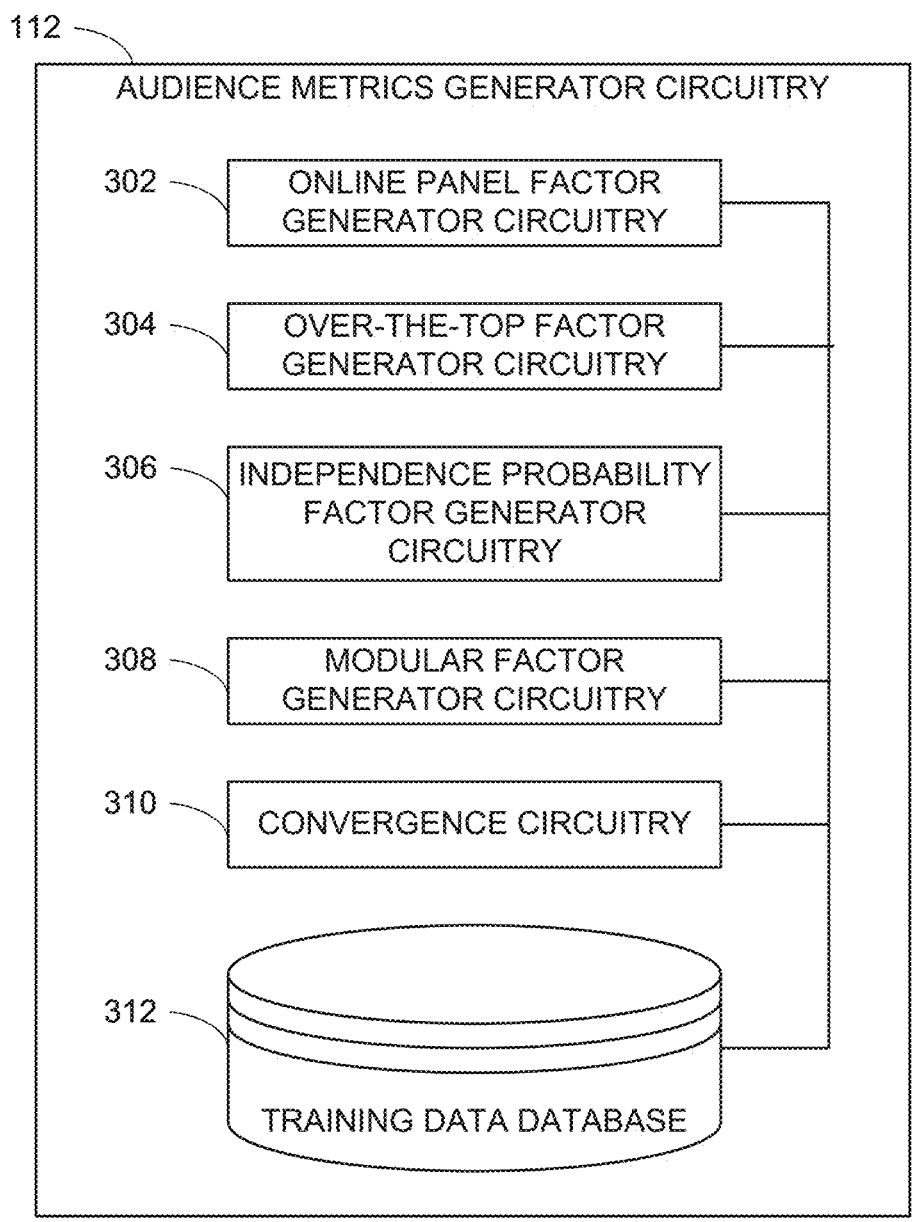
FIG. 3 is a block diagram of the example audience metrics generator circuitry of FIG. 2.

FIG. 3 is a block diagram of the example audience metrics generator circuitry 112 of FIGS. 1 and/or 2. The example audience metrics generator circuitry 112 includes example online panel (OP) factor generator circuitry 302, example OTT factor generator circuitry 304, example independence probability factor generator circuitry 306, example modular factor generator circuitry 308, example convergence circuitry 310, and an example training data database 312.

The example OP factor generator circuitry 302 generates an OP adjustment factor. In some examples, the OP adjustment factor indicates an overlap between a TV audience and a digital media audience. For example, the OP factor generating circuitry 302 obtains TV panel data from the TV panel database 202 (FIG. 2) and digital panel data from the digital panel database 204 (FIG. 2). In some examples, the TV panel data includes a TV audience. In some examples, the digital panel data includes a digital audience, an online (OL) audience overlap, and a mobile audience overlap. For example, the digital audience includes impressions corresponding to media accessed by desktop and/or mobile devices. In some examples, the TV audience and the digital audience do not correspond to unique audiences (e.g., audience members are included in both the TV audience and the digital audience). The OL audience overlap represents an audience count corresponding to impressions associated with TV and desktop devices. For example, the OL audience overlap corresponds to duplicated impressions of audience members that accessed media on the TV and desktop devices. Additionally or alternatively, the mobile audience overlap represents an audience count corresponding to impressions associated with mobile and desktop devices. For example, the mobile audience overlap corresponds to duplicated impressions of audience members that accessed media on desktop devices and mobile devices.

The example OP factor generating circuitry 302 generates a TV-desktop adjustment factor based on the OL audience overlap. In some examples, the TV-desktop adjustment factor is at the demographic ID level and/or the originator level. As used herein, an originator is a publisher of media or a media network from which media is accessed. For example, an originator of television media may be the NBC television network, and an originator of Internet media may be www.NBC.com. As used herein, a media network is a TV network. In some examples, the TV-desktop adjustment factor represents an amount of duplication between the TV audience and the desktop audience. The example OP factor generator circuitry 302 generates a mobile adjustment factor based on the mobile audience overlap. For example, the mobile adjustment factor corresponds to an amount of duplication in the digital audience (e.g., impressions corresponding to both desktop and mobile devices). The example OP factor generating circuitry 302 generates an OP adjustment factor based on the TV-desktop adjustment factor and the mobile adjustment factor. For example, the OP adjustment factor represents an amount of duplication of impressions between the TV audience, the desktop audience, and the mobile audience.

The example OTT factor generator circuitry 304 generates an OTT adjustment factor. In some examples, the OTT adjustment factor indicates an overlap between a TV audience and an OTT audience. For example, a digital audience can include impressions corresponding to OTT devices. The example OTT factor generator circuitry 304 obtains TV panel data from the TV panel database 202 and digital panel data from the digital panel database 204. In some examples, the OTT factor generator circuitry 304 filters the TV panel data and/or the digital panel data. For example, the OTT factor generator circuitry 304 selects TV panel data and/or digital panel data corresponding to a time period and/or demographics of the user (e.g., age, gender, short-term visitor indicator, primary household indicator, etc.).

The example OTT factor generator circuitry 304 estimates an audience overlap between the TV panel data and OTT panel data of the digital panel data. Additionally or alternatively, the OTT factor generator circuitry 304 estimates the universe TV audience and the universe digital audience. The example OTT factor generator circuitry 304 generates the OTT adjustment factor based on the estimated TV audience, the estimated digital audience, and the estimated audience overlap between the TV and digital audiences. For example, the OTT adjustment factor represents an amount of duplication of impressions between the TV audience and an OTT audience.

The example independence probability factor generator circuitry 306 generates an independence probability adjustment factor. In some examples, the independence probability adjustment factor represents an overlap between a TV audience and a digital audience. For example, the independence probability factor generator circuitry 306 obtains TV panel data from the TV panel database 202 and digital panel data from the digital panel database 204. The example independence probability factor generator circuitry 306 determines a TV audience probability, P(TV). For example, the TV audience probability, P(TV), is the probability that a user was exposed to media on a TV. For example, the independence probability factor generator circuitry 306 determines the TV audience probability, P(TV), by dividing the TV audience size by the universe audience size. The example independence probability factor generator circuitry 306 determines a digital audience probability, P(DCR). For example, the digital audience probability, P(DCR), is the probability that the user was exposed to media on a digital device (e.g., a desktop device, a mobile device, etc.). For example, the independence probability factor generating circuitry 306 determines the digital audience probability, P(DCR), by dividing the digital audience size by the universe audience size.

The example independence probability factor generator circuitry 306 determines the independence probability adjustment factor based on example Equation 1.

$$[P(TV)+P(DCR)]-[P(TV)\cdot P(DCR)]=\text{Independence Probability Adjustment Factor} \quad \text{Equation 1}$$

For example, Equation 1 uses the independence probability theory (e.g., viewing media on a first platform does not impact viewing behavior on another platform).

The example modular factor generator circuitry 308 controls a deduplication ensemble. In some examples, the deduplication ensemble is representative of the circuitries and/or methodologies that determine adjustment factors for estimating deduplicated universe audience and media ratings. For example, the deduplication ensemble includes the example OP factor generator circuitry 302, the example OTT factor generator circuitry 304, and the example independence probability factor generator circuitry 306. In some examples, the modular factor generator circuitry 308 controls the deduplication ensemble as new adjustment factor generating circuitries and/or methodologies become available. For example, the modular factor generator circuitry 308 determines whether to generate one or more adjustment factors. For example, the modular factor generator circuitry 308 determines to generate an IP match adjustment factor, a maximum entropy adjustment factor, and/or an identity adjustment factor. In such examples, the modular factor generator circuitry 308 controls the deduplication ensemble to add new adjustment factor generating circuitries and/or methodologies in addition to those available (e.g., the example OP factor generator circuitry 302, the example OTT factor generator circuitry 304, and the example independence probability factor generator circuitry 306). For example, the modular factor generator circuitry 308 determines circuitries to determine the IP match adjustment factor, the maximum entropy adjustment factor, and/or the identity adjustment factor. In some examples, the modular factor generator circuitry 308 determines at least one of the example OP factor generator circuitry 302, the example OTT factor generator circuitry 304, and/or the example independence probability factor generator circuitry 306 will determine the IP match adjustment factor, the maximum entropy adjustment factor, and/or the identity adjustment factor. In other examples, the modular factor generator circuitry 308 determines additional circuitries to include in the deduplication ensemble to determine the IP match adjustment factor, the maximum entropy adjustment factor, and/or the identity adjustment factor.

Additionally or alternatively, the modular factor generator circuitry 308 controls the deduplication ensemble as existing adjustment factor generator circuitries (e.g., the example OP factor generator circuitry 302, the example OTT factor generator circuitry 304, and the example independence probability factor generator circuitry 306) become less valuable. In some examples, the example OP factor generator circuitry 302, the example OTT factor generator circuitry 304, and/or the example independence probability factor generator circuitry 306 can become less valuable when the convergence weight of the associated adjustment factor (e.g., the OP adjustment factor of the example OP factor generator circuitry 302, the OTT adjustment factor of the example OTT factor generator circuitry 304, and the independence probability adjustment factor of the example independence probability factor generator circuitry 306) is below an accuracy threshold, the panel data is not within a selected time period, etc. For example, the modular factor generator circuitry 308 determines whether to remove one or more adjustment factors (e.g., the OP adjustment factor, the OTT adjustment factor, the independence probability adjustment factor, etc.). In some examples, the modular factor generator circuitry 308 determines to remove an adjustment factor if the convergence weight of the adjustment factor (described below) is below an accuracy threshold, the panel data is not within a selected time period, etc. Examples disclosed herein improve the deduplication ensemble development by enabling the deduplication ensemble to be upgraded and/or changed within the existing framework (e.g., the example audience metrics generator circuitry 112). For example, the deduplication ensemble can be upgraded and/or changed to include additional adjustment factors and/or remove existing adjustment factors that are determined to not be valuable over time.

The example convergence circuitry 310 generates a deduplicated reach for total content (RTC) measurement. For example, the RTC measurement can be used to generate a reach measure for a media item accessed across multiple platforms. In some examples, the convergence circuitry 310 is a machine learning controller to generate a deduplicated RTC measurement by applying a model to the adjustment factors. In some examples, the model is based on patterns and/or associations previously learned by the model via a training process. In some examples, the patterns and/or association are representative of interactions between various values of the RTC measurement. In some examples, the model is a random forest or a neural network that accounts for nonlinearities in the RTC measurement. In some examples, the convergence circuitry 310 obtains and combines the adjustment factors (e.g., the OP adjustment factor, the OTT adjustment factor, the independence probability adjustment factor, the IP match factor, the maximum entropy factor, the identity factor, etc.) to generate an aggregated adjustment factor.

In some examples, the convergence circuitry 310 generates coefficients corresponding to the adjustment factors based on a constrained minimization model and historical training data. Additionally or alternatively, the convergence circuitry 310 generates the coefficients based on a linear regression model, etc. For example, the convergence circuitry 310 accesses the historical training data stored in the training data database 312. In some examples, the historical training data includes TV audiences, digital audiences, and audience overlaps between the TV and digital audiences. In some examples, the coefficients can vary for different aggregating type levels (e.g., originator, program, etc.). The example convergence circuitry 310 applies the coefficients to the adjustment factors to generate the aggregated adjustment factor. The example convergence circuitry 310 applies the aggregated adjustment factor to the universe audience estimate to generate the deduplicated reach measure. That is, the aggregated adjustment factor scales the universe audience estimate to deduplicate the universe audience estimate.

Figure 4:
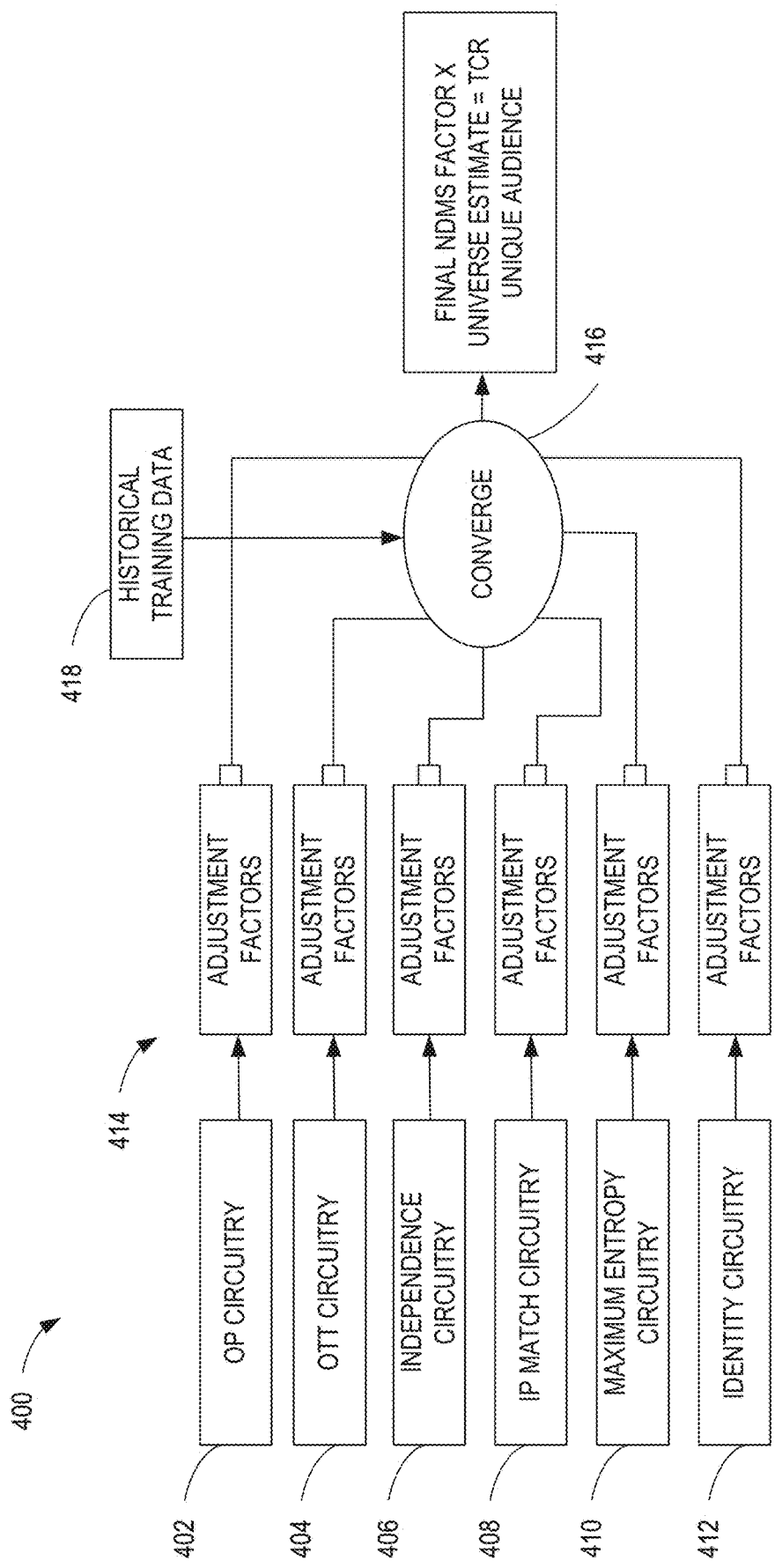
FIG. 4 is an example system to generate audience metrics.

FIG. 4 is an example system 400 to generate audience metrics. The example system 400 includes example OP circuitry 402, example OTT circuitry 404, example independence circuitry 406, example IP match circuitry 408, example maximum entropy circuitry 410, and example identity circuitry 412. In some examples, the OP circuitry 402 is implemented by the OP factor generating circuitry 302 (FIG. 3), the OTT circuitry 404 is implemented by the OTT factor generator circuitry 304 (FIG. 3), and the independence circuitry 406 is implemented by the independence probability factor generating circuitry 306 (FIG. 3). In some examples, the IP match circuitry 408, the maximum entropy circuitry 410, and the identity circuitry 412 are implemented by the modular factor generator circuitry 308 (FIG. 3). For example, the OP circuitry 402, the OTT circuitry 404, the independence circuitry 406, the IP match circuitry 408, the maximum entropy circuitry 410, and the identity circuitry 412 generate the example adjustment factors 414. In the illustrated example of FIG. 4, the circuitries 402, 404, 406, 408, 410, 412 generate one adjustment factor, respectively. For example, the adjustment factors 414 include an OP adjustment factor, an OTT adjustment factor, an independence probability adjustment factor, an IP match factor, a maximum entropy adjustment factor, and an identity adjustment factor. In some examples, the example OP circuitry 402 generates the OP adjustment factor for a cross panel view for deduplication across TV and desktop. In some examples the example independence circuitry 406 generates the independence probability adjustment factor using a probabilistic formula that deduplicates TV and DM measurements under the assumption of independence. In some examples, the example IP match circuitry 408 generates the IP match factor using GTAM meter IP capabilities to match TV and DM measurements. In some examples, a GTAM meter includes capabilities to collect the IP address associated with the TV and DM measurements. In such examples, the example IP match circuitry 408 generates the IP match factor by finding matches between IP addresses from the GTAM meter and IP addresses of the TV and DM measurements. Although reliability of IP matching can vary, such IP matching can be used in connection with example disclosed herein when the accuracy of the IP matching is sufficient to generate audience metrics that satisfy a desired accuracy. In some examples, the example maximum entropy circuitry 410 generates the maximum entropy adjustment factor by exploring correlations in the data.

The example system 400 includes example convergence circuitry 416. In some examples, the convergence circuitry 416 is implemented by the convergence circuitry 310 (FIG. 3). For example, the convergence circuitry 416 obtains the adjustment factors 414 and example historical training data 418 (e.g., stored in the training data database 312 of FIG. 3). In some examples, the convergence circuitry 416 obtains all of the adjustment factors 414. Additionally or alternatively, the convergence circuitry 416 obtains some of the adjustment factors 414. For example, the convergence circuitry 416 obtains the OP adjustment factor, the OTT adjustment factor, and the independence probability adjustment factor. The example convergence circuitry 416 generates coefficients corresponding to the adjustment factors 414 by using a constrained minimization model and applies the coefficients to the adjustment factors 414 to generate an aggregated adjustment factor. The example convergence circuitry 416 applies the aggregated adjustment factor to a universe audience estimate to generate the deduplicated reach measure.

Figure 5:
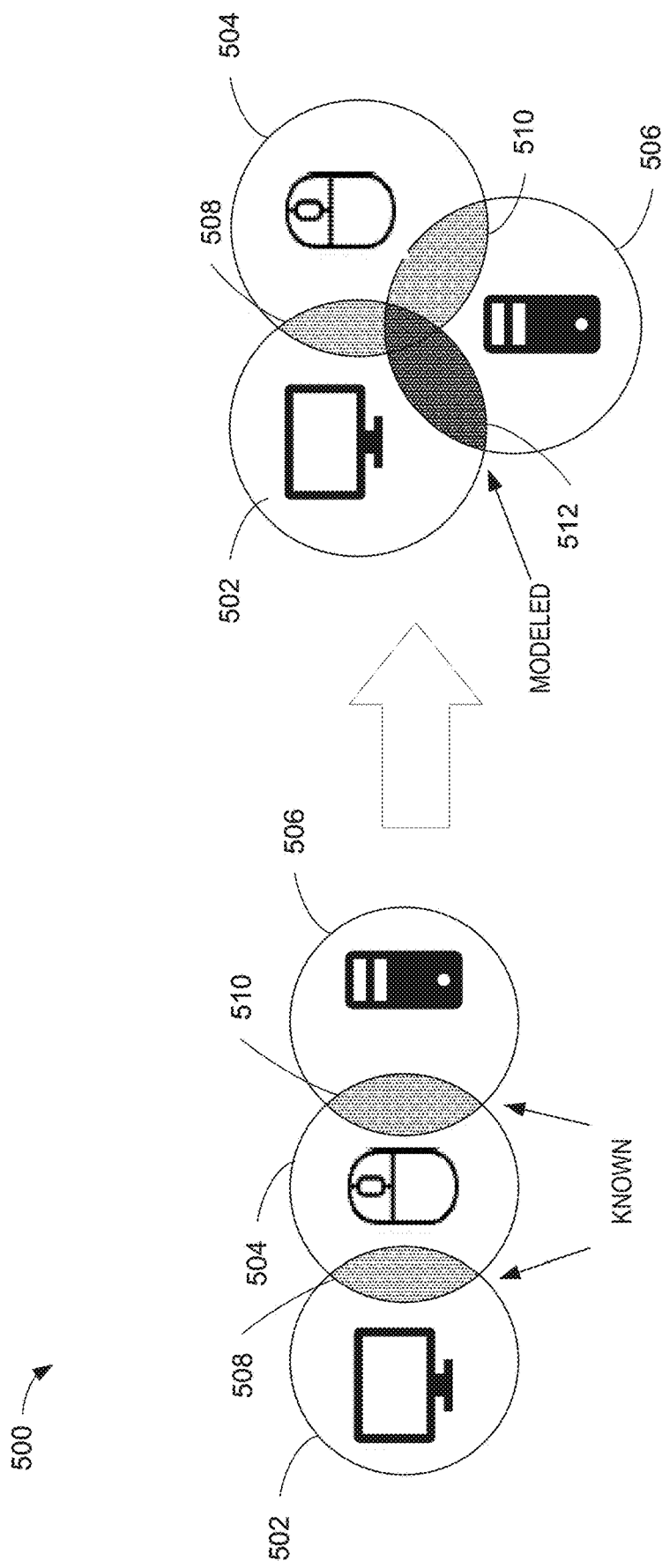
FIG. 5 is an example system to estimate example online panel audience sizes.

FIG. 5 is an example system 500 to determine online panel audience sizes. The example system 500 includes an example TV audience 502, an example desktop audience 504, and an example mobile audience 506. For example, the TV audience 502 corresponds to TV panel data stored in the TV panel database 202 (FIG. 2), and the desktop audience 504 and the mobile audience 506 correspond to the digital panel data determined from the DCR measurements and stored in the digital panel database 204 (FIG. 2). In some examples, the example TV audience 502, the example desktop audience 504, and the example mobile audience 506 are at the originator level and aggregated by demographics (e.g., demographic ID's). In some examples, the TV audience 502 and the desktop audience 504 include an example TV-desktop audience overlap 508. For example, the members of the TV-desktop audience overlap 508 were exposed to media on both the TV and a desktop device. Thus, the combination of the size of the TV audience 502 and the size of the desktop audience 504 includes duplicate impressions represented by the TV-desktop audience overlap 508. In some examples, the TV-desktop audience overlap 508 may depend on how the data (e.g., the TV audience 502 and the desktop audience 504) is aggregated. For example, if the data (e.g., the TV audience 502 and the desktop audience 504) is aggregated at the originator level, the TV-desktop audience overlap 508 represents duplicate households (e.g., the same household was logged as viewing media on both a TV and a desktop). In examples disclosed herein, the TV-desktop audience overlap 508 is known. In some examples, the TV-desktop audience overlap 508 is known via matching panelist ID's that are in both the TV audience 502 and the desktop audience 504. In some examples, the matching panelist IDs result in a small sample size.

Additionally or alternatively, the desktop audience 504 and the mobile audience 506 include an example desktop-mobile audience overlap 510. For example, the members of the desktop-mobile audience overlap 510 were exposed to media on both a desktop device and a mobile device. Thus, the combination of the desktop audience 504 and the mobile audience 506 includes duplicated impressions represented by the desktop-mobile audience overlap 510. In some examples, the size of the desktop-mobile audience overlap 510 may depend on how the data (e.g., the desktop audience 504 and the mobile audience 506) is aggregated. For example, if the data (e.g., the desktop audience 504 and the mobile audience 506) is aggregated at the originator level, the desktop-mobile audience overlap 510 represents duplicate households (e.g., the same household viewed media on a desktop and on a mobile). In examples disclosed herein, the desktop-mobile audience overlap 510 is known. For example, the desktop-mobile audience overlap 510 can be known based on matching panelist ID's in both the desktop audience 504 and the mobile audience 506. In some examples, the matching panelist IDs result in a small sample size. Additionally or alternatively, the desktop audience 504 and the mobile audience 506 include an example modeled desktop-mobile audience overlap 512. For example, the modeled desktop-mobile audience overlap 512 models a quantity of audience members that were exposed to media on both a desktop device and a mobile device. In the illustrated example, the modeled desktop-mobile audience overlap 512 is modeled because it is not known directly from collected data. For example, examples disclosed herein estimate the modeled desktop-mobile audience overlap 512 based on the TV audience 502, the desktop audience 504, the mobile audience 506, the TV-desktop audience overlap 508, and the desktop-mobile audience overlap 510. Examples disclosed herein estimate a deduplicated audience size based on the audiences 502, 504, 506, 508, 510, 512.

Figure 6:
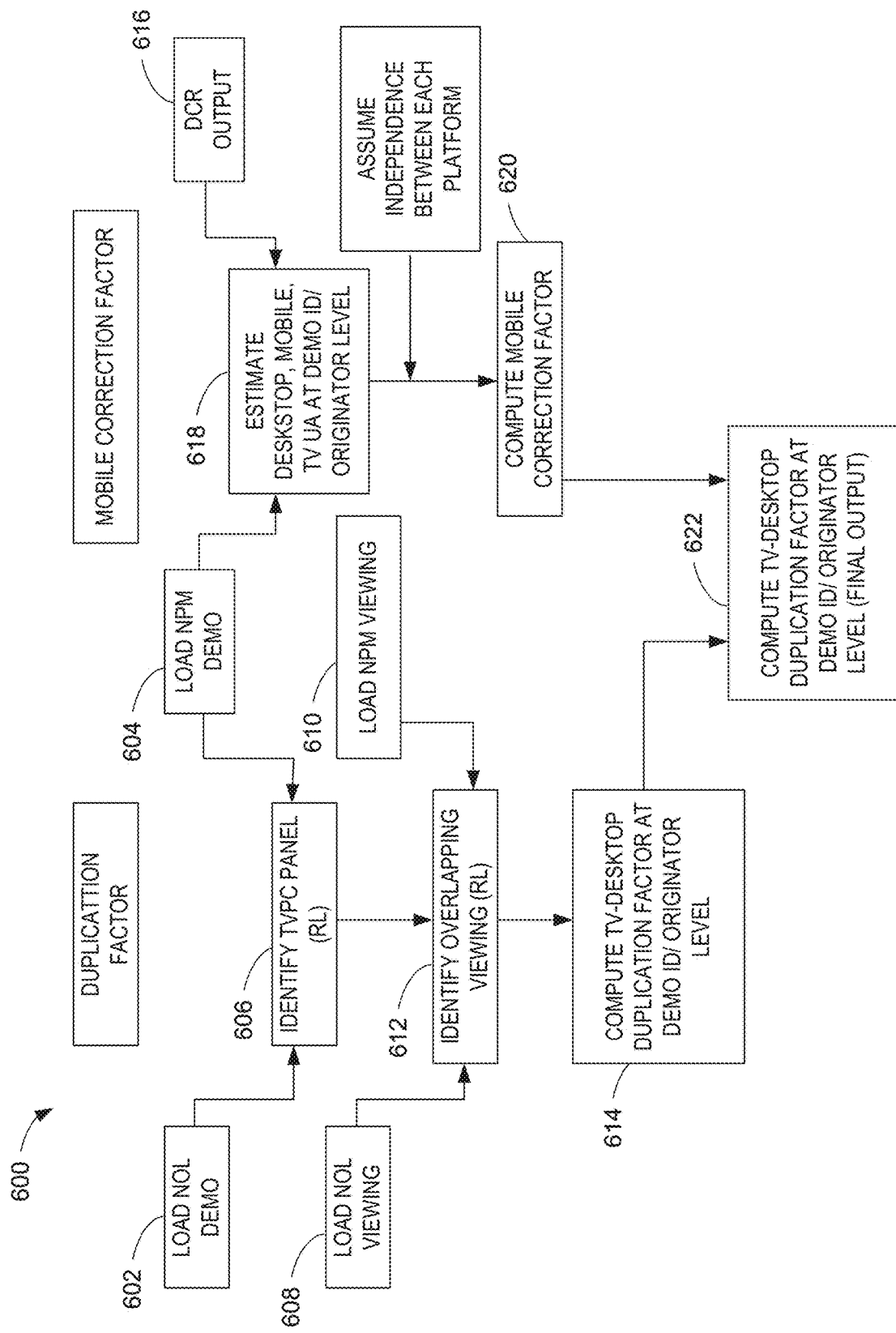
FIG. 6 is an example workflow to determine the OP adjustment factor.

FIG. 6 illustrates an example workflow 600 to determine the OP adjustment factor. At block 602, the example OP factor generator circuitry 302 (FIG. 3) loads OL demographics into memory. For example, the digital panel data includes demographics (e.g., age, gender, panelist ID, etc.) of an OL audience. At block 604, the example OP factor generator circuitry 302 loads TV demographics into memory. For example, the TV panel data includes demographics (e.g., age, gender, panelist weights, panelist IDs, etc.) of the TV audience.

At block 606, the example OP factor generator circuitry 302 identifies the TV-desktop audience. For example, the OP factor generator circuitry 302 maps the TV panelist IDs to the OL panelist IDs. At block 608, the example OP factor generator circuitry 302 loads OL panel viewing data into memory. For example, the OL panel viewing data includes media streaming and/or page viewing (e.g., weights, viewing time, OL panelist ID, etc.). At block 610, the example OP factor generator circuitry 302 loads TV panel viewing data into memory. For example, the TV panel viewing data includes a station code, a viewing date, a TV panelist ID, etc.

At block 612, the example OP factor generator circuitry 302 identifies overlapping viewing. That is, the example OP factor generator circuitry 302 determines the TV-desktop audience of a particular media, etc. In some examples, the TV-desktop audience overlap (e.g., the TV-desktop audience overlap 508 of FIG. 5) is known and representative of an audience of panelists that interacted with both types of media (TV and desktop). In some example, the OP factor generator circuitry 302 determines the TV-desktop audience of a particular media based on the TV-desktop audience overlap. At block 614, the example OP factor generator circuitry 302 generates a TV-desktop duplication factor. For example, the TV-desktop duplication factor represents an amount of duplicated impressions between the TV audience and the desktop audience. In some examples, the TV-desktop duplication factor corresponds to a particular demographic ID and/or a particular originator level (e.g., a network level measurement such as, the television network NBC). In examples disclosed herein, a demographic ID is an identifier corresponding to a demographic category (e.g., female 18-25, male 18-25, female 26-30, male 26-30, etc.).

At block 616, the example OP factor generator circuitry 302 loads the digital panel data. In some examples, the digital panel data is DCR data. In some examples, the digital panel data includes a DM restore output (e.g., an output of a model) with mobile, desktop, and/or total digital universe audience. At block 618, the example OP factor generator circuitry 302 estimates a desktop-mobile-TV universe audience. For example, the OP factor generator circuitry 302 estimates the desktop-mobile-TV universe audience based on the TV panel data and the digital panel data. In some examples, the desktop-mobile-TV universe audience corresponds to a particular demographic ID and/or a particular originator level.

At block 620, the example OP factor generator circuitry 302 generates a mobile correction factor. For example, the mobile correction factor represents an amount of duplication between the TV audience and the mobile audience. At block 622, the example OP factor generator circuitry 302 generates the OP adjustment factor. For example, the OP factor generator circuitry 302 determines the OP adjustment factor based on the TV-desktop duplication factor and the mobile correction factor. In some examples, the OP adjustment factor corresponds to a particular demographic ID and/or a particular originator level.

Figure 7:
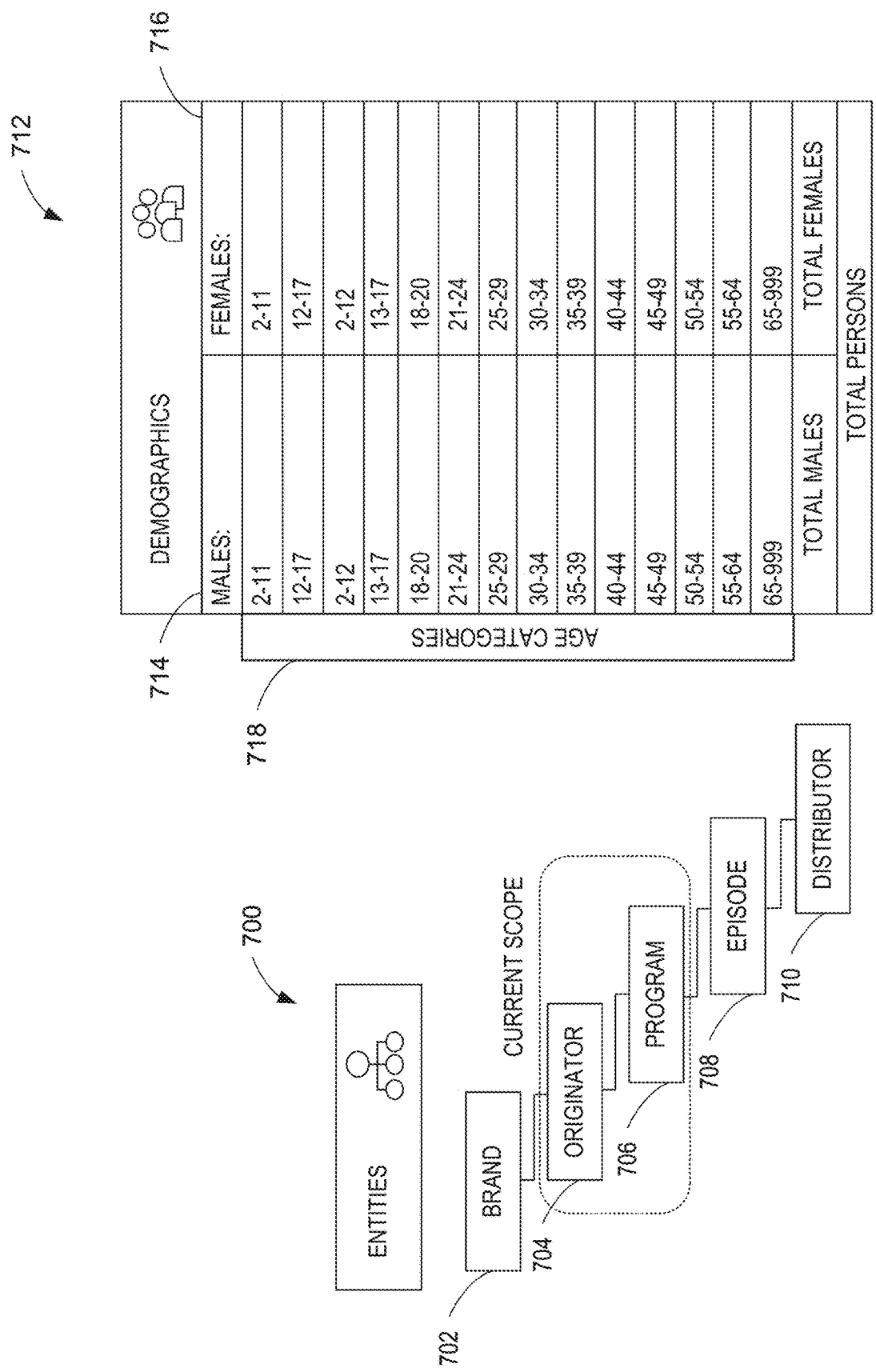
FIG. 7A is an example illustration of example reporting break levels in accordance with teachings of this disclosure.
FIG. 7B is an example demographic table in accordance with teachings of this disclosure.

FIG. 7A is an example illustration of example reporting break levels 700 in accordance with teachings of this disclosure. In some examples, the TV panel data and the digital panel data include an entity. In some examples, the entity can include a brand, an originator, a program, an episode, a distributor, etc. The example reporting break levels 700 include the different entities that are included in the TV panel data and the digital panel data. In the illustrated example, the example reporting break levels 700 include an example brand 702, an example originator 704, an example program 706, an example episode 708, and an example distributor 710. The example originator 704 can include a broadcast TV network, a streaming service, etc., and the example program 706 can include a TV show, a newscast, a movie, etc. In some examples, the current scope of the examples disclosed herein is directed to the example originator 704 and the example program 706 levels in the example reporting break levels 700. However, examples disclosed herein can be directed to other of the levels in the example reporting break levels 700. FIG. 7B is an example demographic table 712 in accordance with teachings of this disclosure. In some examples, the TV panel data and the digital panel data include demographics. In the illustrated example, the example demographic table 712 includes demographic IDs that identify different demographic categories. For example, the example demographic table 712 includes example male demographic IDs 714 (e.g., male 18-25, male 26-30, etc.) and example female demographic IDs 716 (e.g., female 18-25, female 26-30, etc.) that are associated with example age categories 718 (e.g., 18-25, 26-30, etc.). As described above, some adjustment factors (e.g., the TV-desktop adjustment factor, OP adjustment factor), duplication factors (e.g., the TV-desktop duplication factor), universe audience measurements (e.g., the desktop-mobile-TV universe audience), etc. correspond to a particular originator level (e.g., the example originator 704) and/or a particular demographic ID (e.g., the example male demographic IDs 714 and the example female demographic IDs 716).

Figure 8:
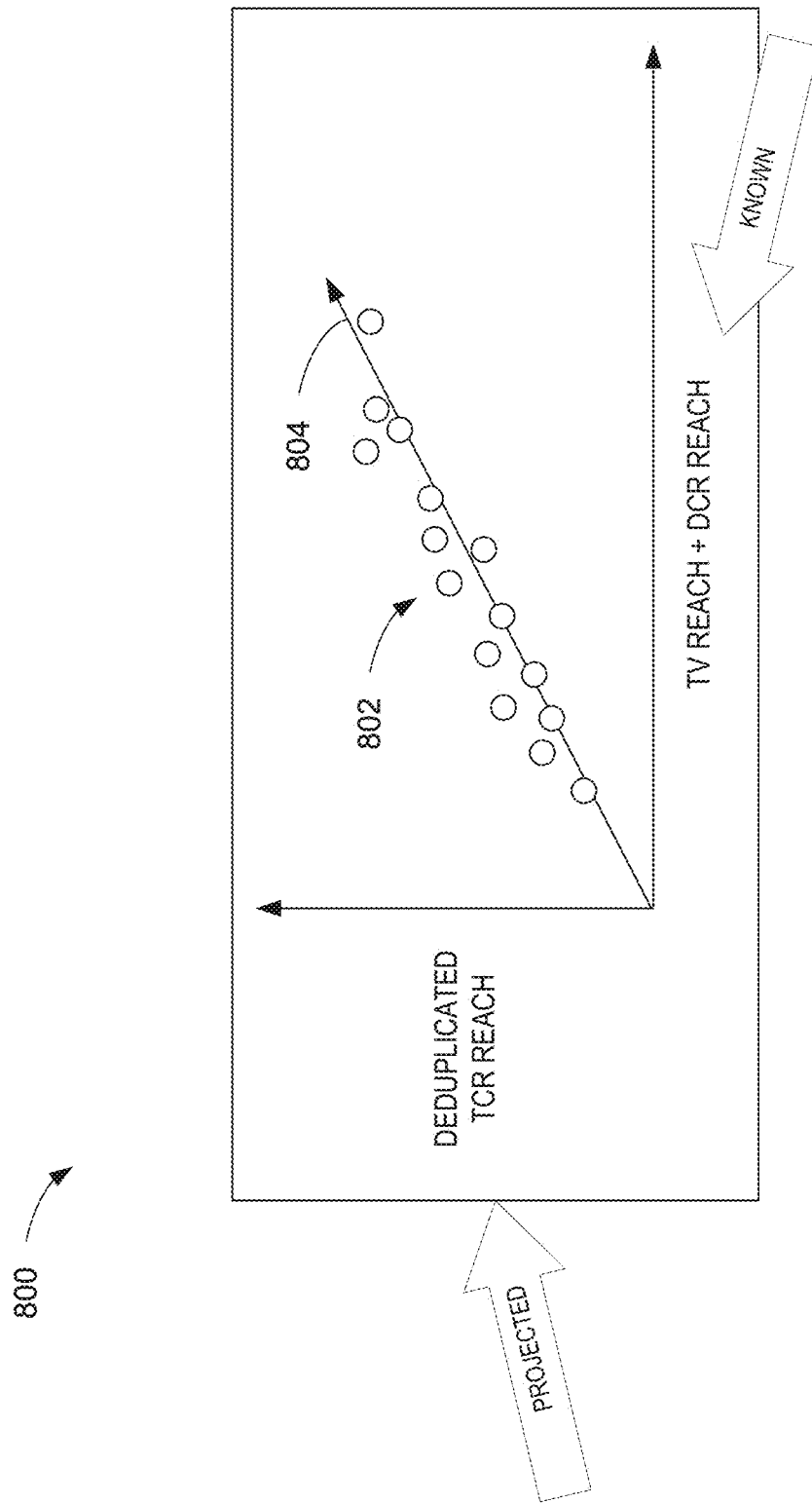
FIG. 8 illustrates an example graph of deduplicated reach measures.

FIG. 8 illustrates an example graph 800 of deduplicated media ratings. In the illustrated example of FIG. 8, the x-axis is the summation of the TV reach and digital reach. The y-axis of the graph 800 represents the deduplicated TCR reach. That is, the y-axis represents the unique audience of TV and digital media. The example graph 800 includes example historical data points 802. For example, the historical data points 802 represent the relationship between the summation of the TV and digital reach and the deduplicated reach. The example graph 800 includes an example linear regression model line 804 representing outputs of a linear regression model. For example, a linear regression model can generate coefficients based on the historical data points 802 to project deduplicated reach for new data (e.g., previously unseen TV and digital audiences). For example, the convergence circuitry 310 can use the linear regression model to generate the coefficients for the adjustment factors.

In some examples, the audience metrics generator circuitry 112 includes means for determining an online panel adjustment factor. For example, the means for determining an online panel adjustment factor may be implemented by the example OP factor generator circuitry 302. In some examples, the example OP factor generator circuitry 302 may be implemented by machine executable instructions such as that implemented by at least blocks 902 of FIG. 9, 1002, 1004, 1006, 1008, 1010, 1012, 1014, 1016 of FIG. 10 executed by processor circuitry, which may be implemented by the example processor circuitry 1312 of FIG. 13, the example processor circuitry 1400 of FIG. 14, and/or the example Field Programmable Gate Array (FPGA) circuitry 1500 of FIG. 15. In other examples, the example OP factor generator circuitry 302 is implemented by other hardware logic circuitry, hardware implemented state machines, and/or any other combination of hardware, software, and/or firmware. For example, the example OP factor generator circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audience metrics generator circuitry 112 includes means for determining an over-the-top adjustment factor. For example, the means for determining an over-the-top adjustment factor may be implemented by the example OTT factor generator circuitry 304. In some examples, the example OTT factor generator circuitry 304 may be implemented by machine executable instructions such as that implemented by at least blocks 904 of FIG. 9, 1102, 1104, 1106, 1108, 1110, 1112 of FIG. 11 executed by processor circuitry, which may be implemented by the example processor circuitry 1312 of FIG. 13, the example processor circuitry 1400 of FIG. 14, and/or the example Field Programmable Gate Array (FPGA) circuitry 1500 of FIG. 15. In other examples, the example OTT factor generator circuitry 304 is implemented by other hardware logic circuitry, hardware implemented state machines, and/or any other combination of hardware, software, and/or firmware. For example, the example OTT factor generator circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audience metrics generator circuitry 112 includes means for determining an independence probability adjustment factor. For example, the means for determining an independence probability adjustment factor may be implemented by the example independence probability factor generator circuitry 306. In some examples, the example independence probability factor generator circuitry 306 may be implemented by machine executable instructions such as that implemented by at least blocks 906 of FIG.

Figure 12:
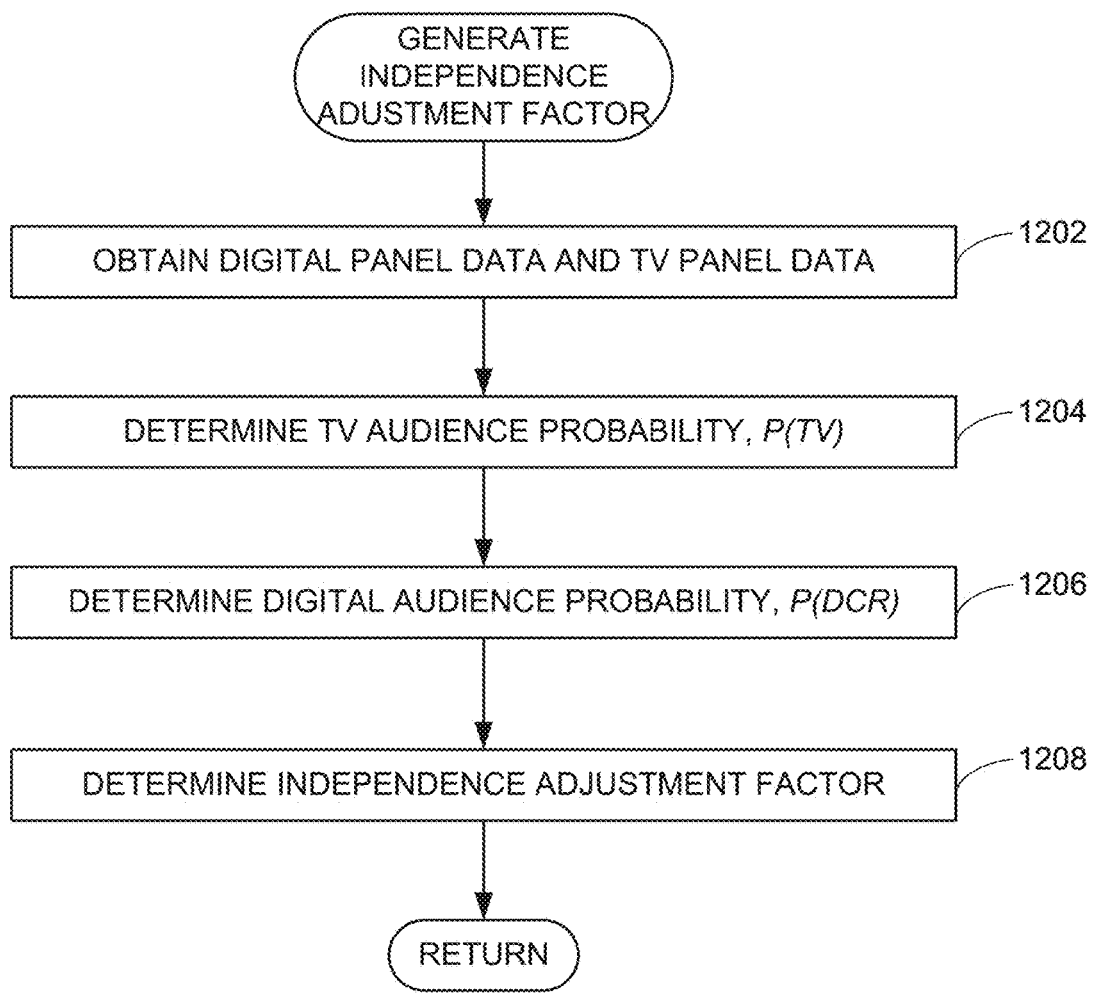
FIG. 12 is a flowchart representative of example machine readable instructions that may be executed by example processor circuitry to implement the example independence probability factor generator circuitry of FIG. 3 to generate an independence probability adjustment factor.
Figure 13:
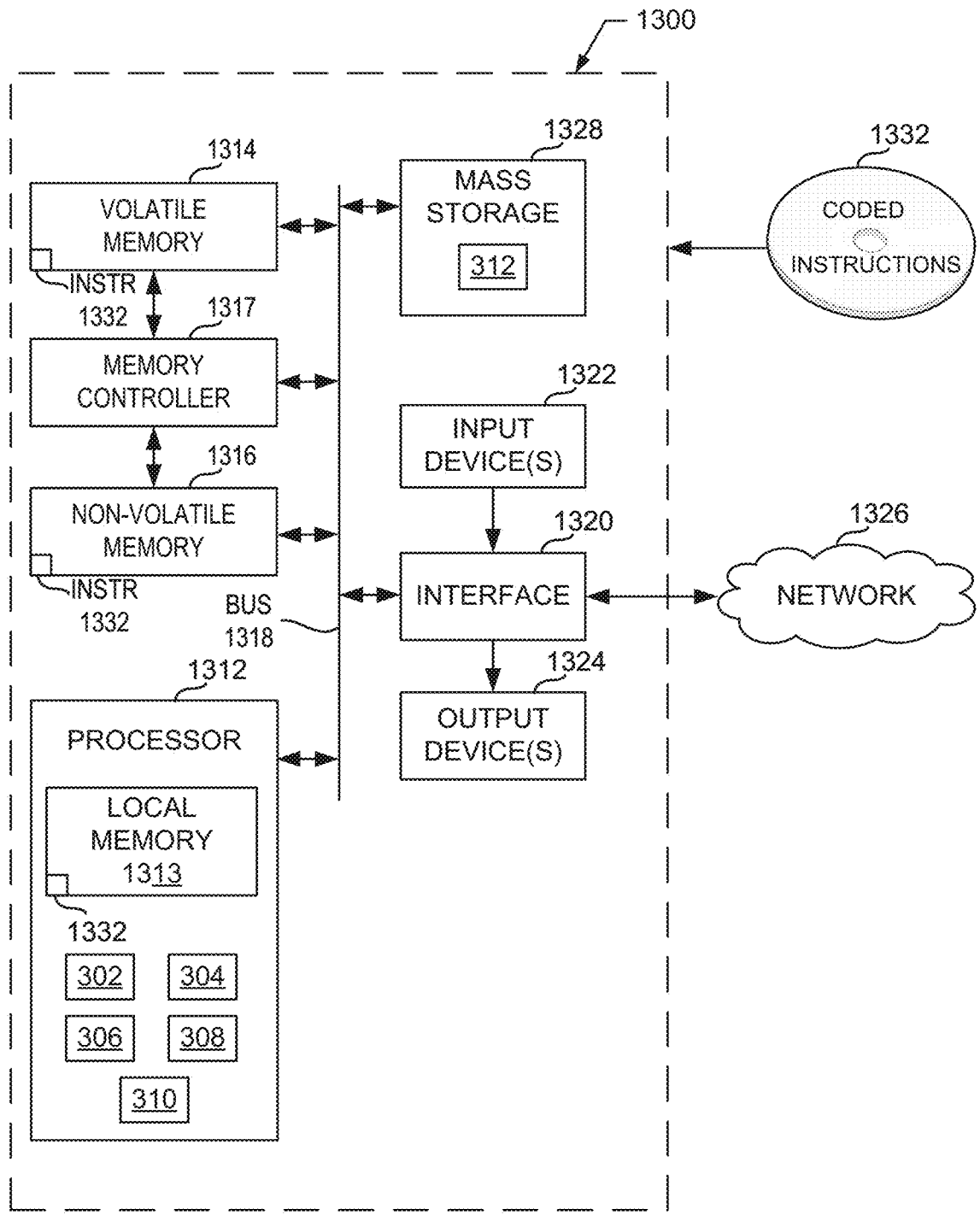
FIG. 13 is a block diagram of an example processing platform including processor circuitry structured to execute the example machine readable instructions of FIGS. 9-12 to implement the example audience metrics generator circuitry of FIGS. 2 and/or 3.
Figure 14:
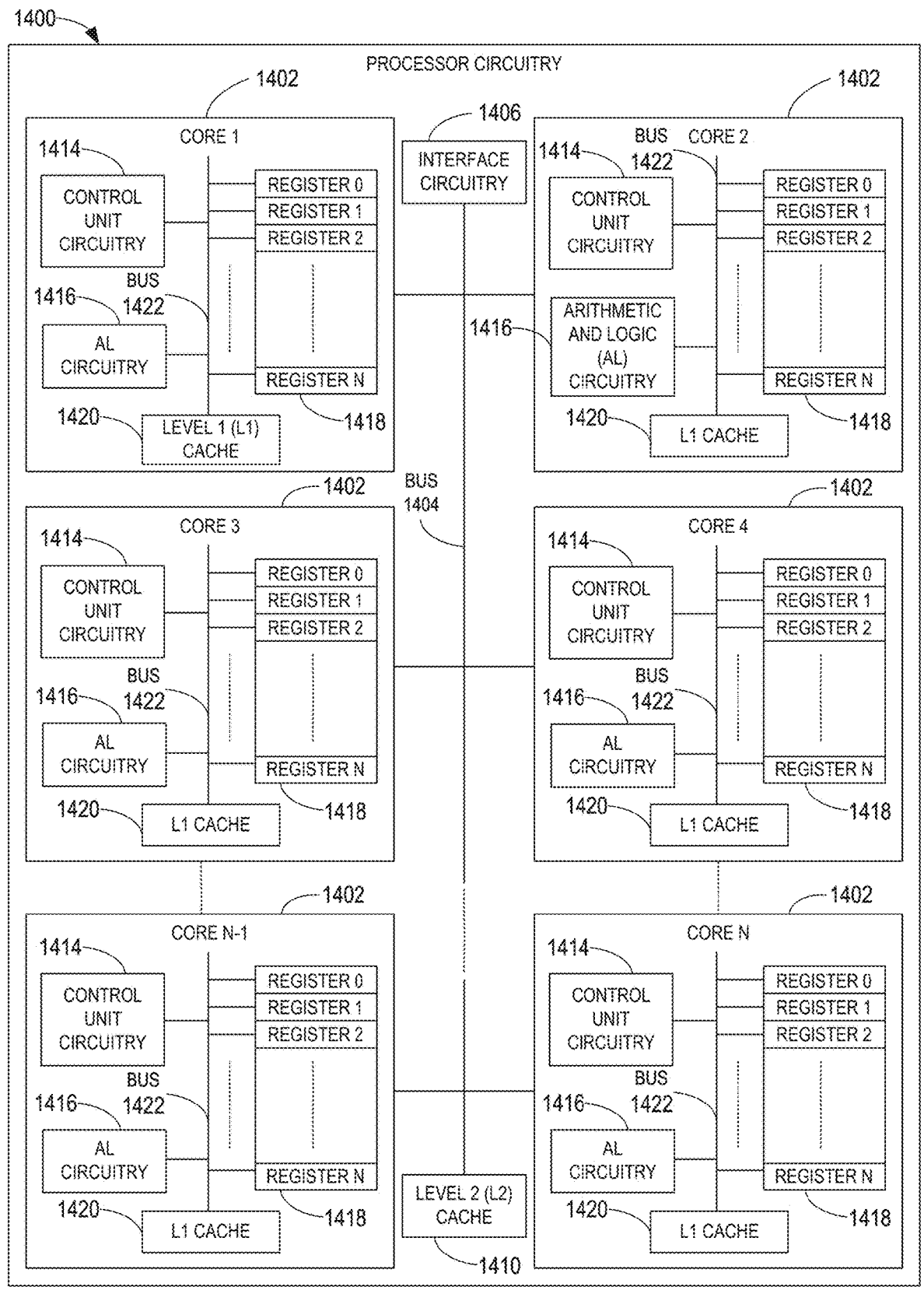
FIG. 14 is a block diagram of an example implementation of the processor circuitry of FIG. 13.
Figure 15:
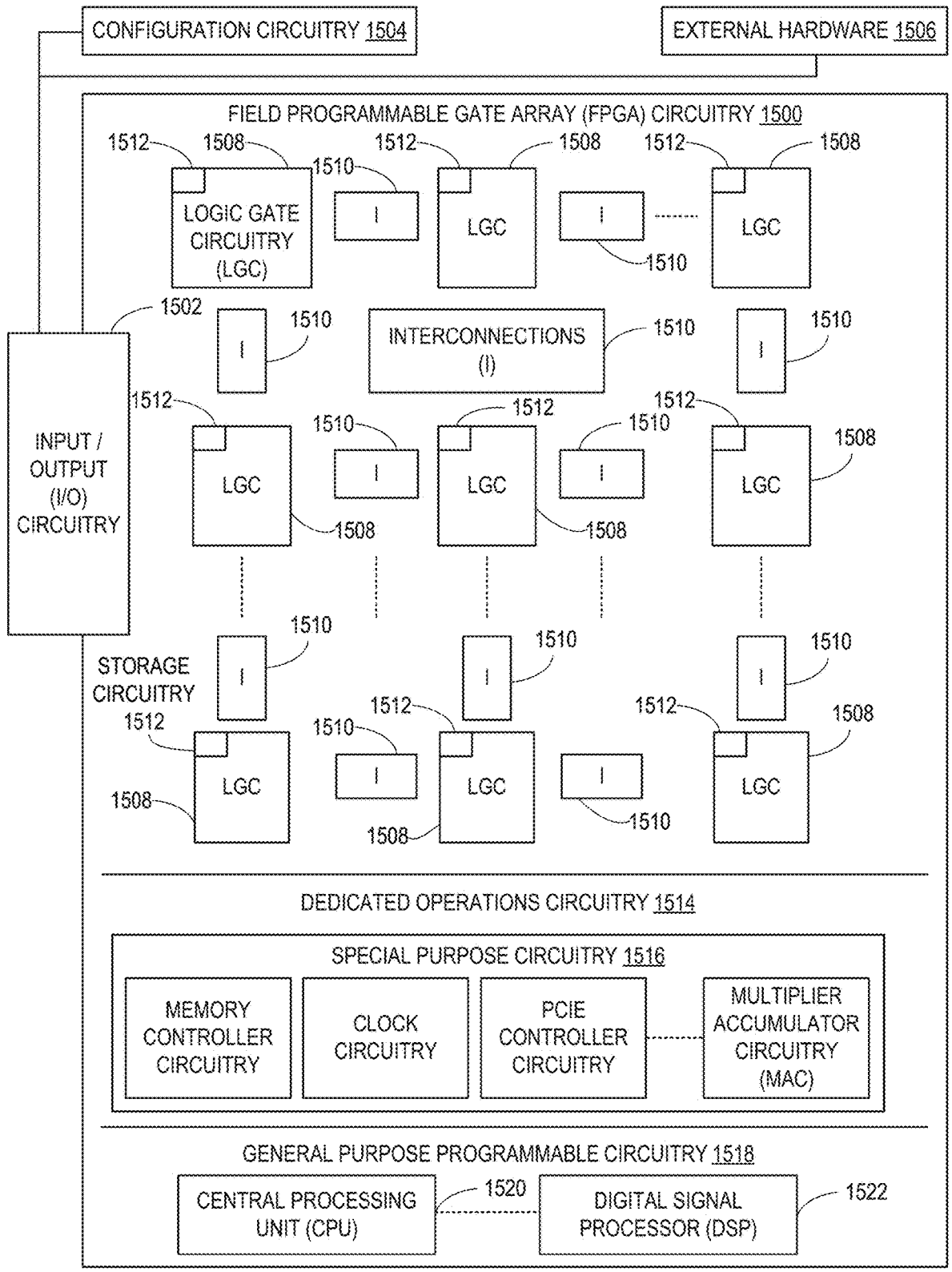
FIG. 15 is a block diagram of another example implementation of the processor circuitry of FIG. 13.

9, 1202, 1204, 1206, 1208 of FIG. 12 executed by processor circuitry, which may be implemented by the example processor circuitry 1312 of FIG. 13, the example processor circuitry 1400 of FIG. 14, and/or the example Field Programmable Gate Array (FPGA) circuitry 1500 of FIG. 15. In other examples, the example independence probability factor generator circuitry 306 is implemented by other hardware logic circuitry, hardware implemented state machines, and/or any other combination of hardware, software, and/or firmware. For example, the example independence probability factor generator circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audience metrics generator circuitry 112 includes means for determining a modular adjustment factor. For example, the means for determining a modular adjustment factor may be implemented by the example modular factor generator circuitry 308. In some examples, the example modular factor generator circuitry 308 may be implemented by machine executable instructions such as that implemented by at least blocks 908, 910 of FIG. 9 executed by processor circuitry, which may be implemented by the example processor circuitry 1312 of FIG. 13, the example processor circuitry 1400 of FIG. 14, and/or the example Field Programmable Gate Array (FPGA) circuitry 1500 of FIG. 15. In other examples, the example modular factor generator circuitry 308 is implemented by other hardware logic circuitry, hardware implemented state machines, and/or any other combination of hardware, software, and/or firmware. For example, the example modular factor generator circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audience metrics generator circuitry 112 includes means for determining a deduplicated reach. For example, the means for determining a deduplicated reach may be implemented by the example convergence circuitry 310. In some examples, the example convergence circuitry 310 may be implemented by machine executable instructions such as that implemented by at least blocks 912, 914 of FIG. 9 executed by processor circuitry, which may be implemented by the example processor circuitry 1312 of FIG. 13, the example processor circuitry 1400 of FIG. 14, and/or the example Field Programmable Gate Array (FPGA) circuitry 1500 of FIG. 15. In other examples, the example convergence circuitry 310 is implemented by other hardware logic circuitry, hardware implemented state machines, and/or any other combination of hardware, software, and/or firmware. For example, the example convergence circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the audience metrics generator circuitry 112 of FIGS. 1 and/or 2 is illustrated in FIG. 3, one or more of the elements, processes, and/or devices illustrated in FIG. 3 may be combined, divided, re-arranged, omitted, eliminated, and/or implemented in any other way. Further, the example OP factor generator circuitry 302, the example OTT factor generator circuitry 304, the example independence probability factor generator circuitry 306, the example modular factor generator circuitry 308, the example convergence circuitry 310, the example training data database 312, and/or, more generally, the example audience metrics generator circuitry 112 of FIG. 3, may be implemented by hardware alone or by hardware in combination with software and/or firmware. Thus, for example, any of the example OP factor generator circuitry 302, the example OTT factor generator circuitry 304, the example independence probability factor generator circuitry 306, the example modular factor generator circuitry 308, the example convergence circuitry 310, the example training data database 312, and/or, more generally, the example audience metrics generator circuitry 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example audience metrics generator circuitry 112 of FIGS. 1 and/or 2 may include one or more elements, processes, and/or devices in addition to, or instead of, those illustrated in FIG. 3, and/or may include more than one of any or all of the illustrated elements, processes and devices.

Flowcharts representative of example hardware logic circuitry, machine readable instructions, hardware implemented state machines, and/or any combination thereof for implementing the audience metrics generator circuitry 112 of FIGS. 1, 2, and/or 3 are shown in FIGS. 9-12. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices.

Further, although the example program is described with reference to the flowcharts illustrated in FIGS. 9-12, many other methods of implementing the example audience metrics generator circuitry 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9-12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

Figure 9:
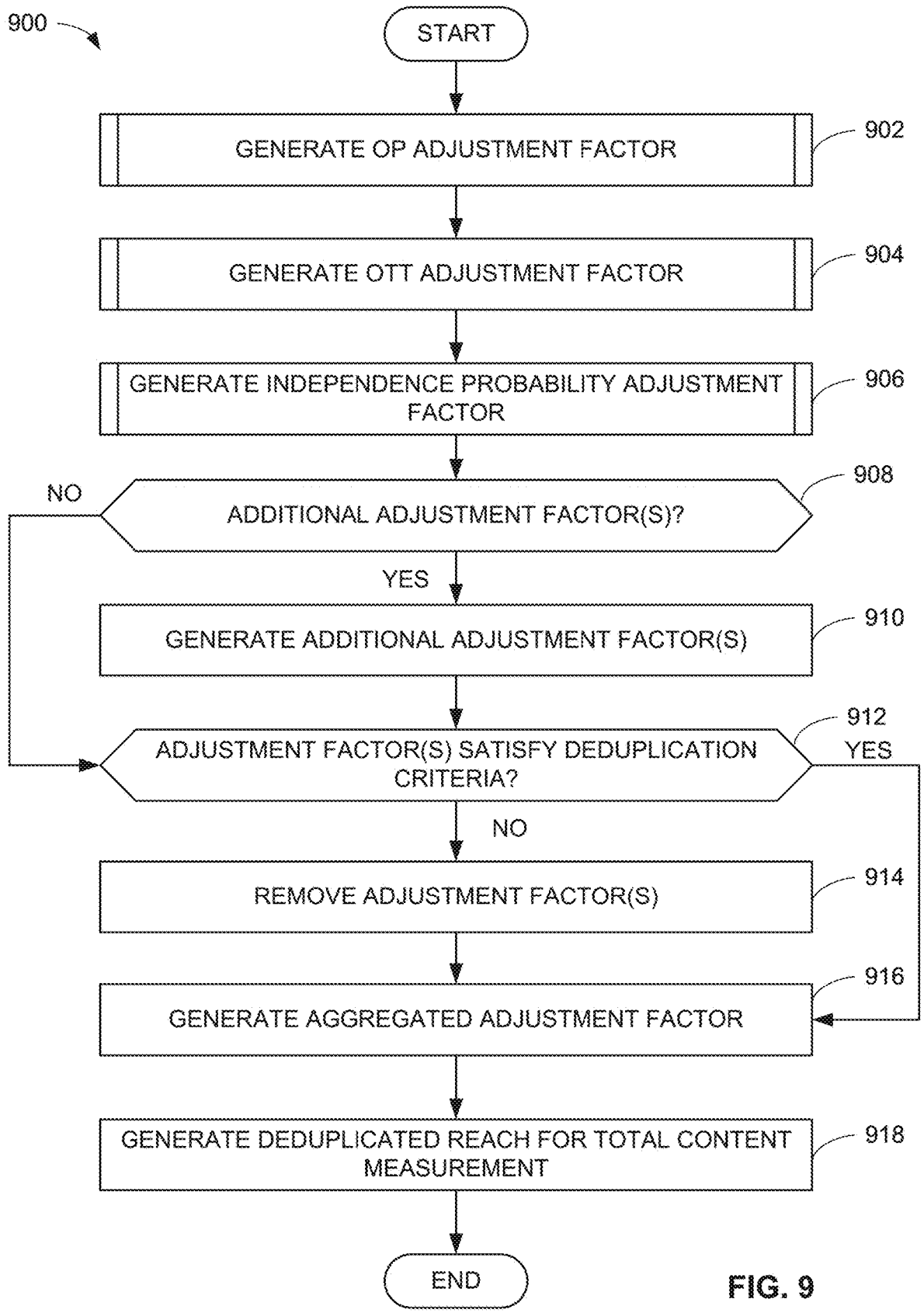
FIG. 9 is a flowchart representative of example machine readable instructions that may be executed by example processor circuitry to implement the example audience metrics generator circuitry of FIGS. 2 and/or 3 to estimate a deduplicated reach.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by processor circuitry to estimate a deduplicated reach. The machine readable instructions and/or operations 900 of FIG. 9 begin at block 902, at which the example OP factor generator circuitry 302 (FIG. 3) generates an OP adjustment factor. For example, the OP factor generator circuitry 302 accesses TV panel data from the TV panel database 202 (FIG. 2) and digital panel data from the digital panel database 204 (FIG. 2). The example OP factor generator circuitry 302 generates the OP adjustment factor based on the TV panel data and the digital panel data. Example instructions that may be used to implement block 902 are described in more detail below in connection with FIG. 10.

At block 904, the example OTT factor generator circuitry 304 (FIG. 3) generates an OTT adjustment factor. For example, the OTT factor generator circuitry 304 accesses the TV panel data and the digital panel data to generate the OTT adjustment factor. Example instructions that may be used to implement block 904 are described in more detail below in connection with FIG. 11.

At block 906, the example independence probability factor generator circuitry 306 (FIG. 3) generates an independence probability adjustment factor. For example, the independence probability factor generator circuitry 306 generates a TV audience probability and a digital audience probability. The example independence probability factor generator circuitry 306 generates the independence probability adjustment factor based on the TV audience probability and the digital audience probability using the independence probability theory. Example instructions that may be used to implement block 906 are described in more detail below in connection with FIG. 12.

At block 908, the example modular factor generator circuitry 308 (FIG. 3) determines whether to generate additional adjustment factors. For example, the modular factor generator circuitry 308 determines whether additional models and/or data is available. If, at block 908, the modular factor generator circuitry 308 determines to not generate additional adjustment factors, the instructions 900 proceed to block 912. If, at block 908, the modular factor generator circuitry 308 determines to generate additional adjustment factors, the instructions 900 continue to block 910, where the modular factor generator circuitry 308 generates additional adjustment factors. For example, the modular factor generator circuitry 308 generates an IP match factor, a maximum entropy adjustment factor, an identity adjustment factor, etc. In some examples, the example modular factor generator circuitry 308 controls the deduplication ensemble as new factor generating circuitries and/or methodologies become available or existing factor generators become less valuable.

At block 912, the example modular factor generator circuitry 308 determines whether the adjustment factors satisfy deduplication criteria. For example, the modular factor generator circuitry 308 determines whether to remove one or more adjustment factors (e.g., the OP adjustment factor, the OTT adjustment factor, the independence probability adjustment factor, etc.). In some examples, the deduplication criteria can be if the convergence weight of the adjustment factor is above an accuracy threshold, the panel data is within a selected time period, etc. If, at block 912, the modular factor generator circuitry 308 determines the adjustment factors satisfy the deduplication criteria, the instructions 900 proceed to block 916. If, at block 912, the modular factor generator circuitry 308 determines the adjustment factors do not satisfy the deduplication criteria, the instructions 900 continue to block 914, where the modular factor generator circuitry 308 removes one or more adjustment factors (e.g., the OP adjustment factor, the OTT adjustment factor, the independence probability adjustment factor, an IP match factor, a maximum entropy adjustment factor, an identity adjustment factor, etc.).

At block 916, the example convergence circuitry 310 (FIG. 3) generates an aggregated adjustment factor. For example, the convergence circuitry 310 generates coefficients corresponding to the OP adjustment factor, the OTT adjustment factor, the independence probability adjustment factor, etc. For example, the convergence circuitry 310 generates the coefficients based on historical training data using a constrained optimization model. In some examples, the historical training data includes TV audiences, digital audiences, and audience overlaps between the TV and digital audiences. In some examples, the convergence circuitry 310 runs a constrained optimization model to estimate the coefficients that are applied to the reach values adjusted by the calculated factors (e.g., one or more of the OP adjustment factor, the OTT adjustment factor, the independence probability adjustment factor, etc.). In some examples, the coefficients are static (e.g., don't change over time), but the adjustment factors are updated or changed at every run of the algorithm based on the panel. For example, the algorithm applies coefficients estimated by the constrained optimization model, and some of the adjustment factors are changed from time to time (e.g., once per month) based on panel date when the algorithm is run. In some examples, the coefficients can vary for different aggregating type levels (e.g., originator, program, etc.).

In some examples, the convergence circuitry 310 determines respective reaches (e.g., an OP reach, OTT reach, independent reach, etc.) by multiplying the corresponding adjustment factors (e.g., the OP adjustment factor, the OTT adjustment factor, the independence probability adjustment factor, etc.) by the sum of the reaches. The example convergence circuitry 310 applies the coefficients to the OP adjustment factor, the OTT adjustment factor, the independence probability adjustment factor, etc. to generate the aggregated adjustment factor. In some examples, the convergence circuitry 310 generates the aggregated adjustment factor based on a sum of the coefficients associated with the adjustment factors (e.g., the OP adjustment factor, the OTT adjustment factor, the independence probability adjustment factor, etc.) multiplied by the corresponding estimated reaches (e.g., OP reach, OTT reach, independent reach, etc.).

At block 918, the example convergence circuitry 310 generates a deduplicated reach measure. In some examples, the convergence circuitry 310 generates the deduplicated reach measure based on a comparison of the aggregated adjustment factor to historical data. For example, the convergence circuitry 310 generates the deduplicated reach measure by applying a model to the adjustment factors to generate the aggregated adjustment factor. In some examples, the model is based on patterns and/or associations previously learned by the model via a training process using historical data. The example convergence circuitry 310 applies the aggregated adjustment factor to the universe audience estimate to generate the deduplicated reach measure. That is, the aggregated adjustment factor scales the universe audience estimate to deduplicate the universe audience estimate. In some examples, the convergence circuitry 310 multiplies the aggregated adjustment factor by the universe audience estimate to determine the deduplicated audience. The example instructions of FIG. 9 end.

Figure 10:
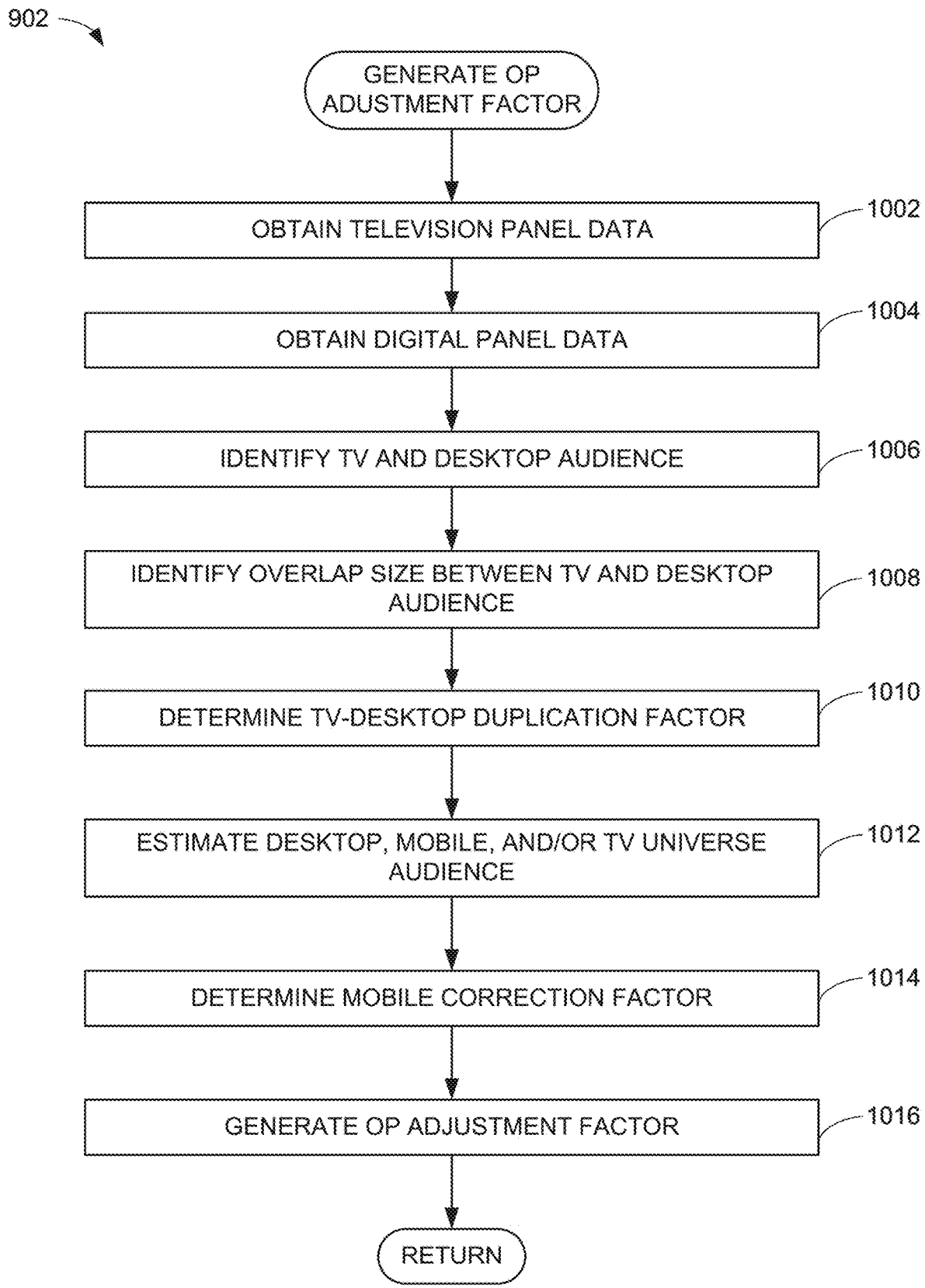
FIG. 10 is a flowchart representative of example machine readable instructions that may be executed by example processor circuitry to implement the example online panel factor generator circuitry of FIG. 3 to generate an OP adjustment factor.

FIG. 10 is a flowchart representative of example machine readable instructions and/or operations 902 that may be executed and/or instantiated by processor circuitry to generate an OP adjustment factor. The machine readable instructions and/or operations 902 of FIG. 10 may be used to implement block 902 of FIG. 9. The example instructions and/or operations 902 of FIG. 10 begin at block 1002, at which the example OP factor generator circuitry 302 (FIG. 3) obtains TV panel data stored in the TV panel database 202 (FIG. 2). For example, the TV panel data includes viewing records, or impression records, attributed to the various originators (e.g., TV networks) and that are based on a household, a person ID, a demographic group, etc. and associated weights (e.g., household/person weights that need not be originator specific). At block 1004, the example OP factor generator circuitry 302 obtains digital panel data stored in the digital panel database 204 (FIG. 2). For example, the digital panel data includes online panel data (e.g., desktop panel data, mobile panel data, etc.). In some examples, the digital panel data includes interaction records based on a household, a person ID, a demographic group, etc. attributed to media. In some examples, the digital panel data is aligned to the TV panel data.

At block 1006, the example OP factor generator circuitry 302 identifies a TV-desktop audience size. For example, the OP factor generator circuitry 302 identifies the TV-desktop audience size by mapping TV panelist IDs of the TV panel data to online panelist IDs of the digital panel data. At block 1008, the example OP factor generator circuitry 302 identifies an overlap size in the TV-desktop audience (e.g., a TV-desktop audience overlap). That is, the TV-desktop audience may include duplicated impressions pertaining to an overlap (e.g., the TV-desktop audience overlap 508 of FIG. 5) between a TV audience (e.g., the TV audience 502 of FIG. 5) and a desktop audience (e.g., the desktop audience 504 of FIG. 5). At block 1010, the example OP factor generator circuitry 302 determines a TV-desktop duplication factor based on the TV-desktop audience overlap. For example, the TV-desktop duplication factor represents an amount of duplication in the TV-desktop audience overlap. In some examples, the OP factor generator circuitry 302 determines the TV-desktop duplication factor by determining the panelists and associated weights from the TV-desktop audience overlap and whether the panelists interacted with a media type on a panel type (e.g., a TV and desktop panel).

At block 1012, the example OP factor generator circuitry 302 estimates the desktop-mobile-TV audience. For example, the digital panel data includes the desktop-mobile audience and the overlap size in the desktop-mobile audience (e.g., the desktop-mobile audience overlap 510 of FIG. 5). The example OP factor generator circuitry 302 estimates the desktop-mobile-TV audience based on the desktop-mobile audience, the overlap in the desktop-mobile audience, and the TV panel data. In some examples, the OP factor generator circuitry 302 estimates the desktop-mobile-TV audience using a sum of weights of the desktop-mobile audience, the overlap in the desktop-mobile audience, and the TV panel data. At block 1014, the example OP factor generator circuitry 302 determines a mobile correction factor. For example, the mobile correction factor represents an estimated overlap between the mobile audience and the TV audience. In some examples, the OP factor generator circuitry 302 determines the mobile correction factor using the DM measurement to estimate an amount of mobile viewing that would be expected given the amount of TV and desktop viewing that is observed (e.g., TV panel data and digital panel data). In some examples, the mobile correction factor is multiplied by the OP adjustment factor at the originator level (e.g., a TV network level). The mobile correction factor can be used as a multiplier per demographic group to estimate amounts of mobile viewing for different demographic groups. At block 1016, the example OP factor generator circuitry 302 generates the OP adjustment factor. For example, the OP factor generator circuitry 302 generates the OP adjustment factor based on the TV-desktop duplication factor and the mobile correction factor. In some examples, the OP factor generator circuitry 302 determines a sum of the weights of panelists that interacted with media on a mobile or desktop (e.g., from the digital panel data and DM measurement). In some examples, the OP factor generator circuitry 302 determines a sum of the weights of panelists that interacted with media on a TV or desktop (e.g., from the TV panel data and digital panel data). In some examples, the OP factor generator circuitry 302 determines the OP adjustment factor based on an average of the sum of the weights of panelists that interacted with media on a mobile or desktop and the sum of the weights of panelists that interacted with media on a TV or desktop. The example instructions 902 end and control returns to block 904 of FIG. 9.

Figure 11:
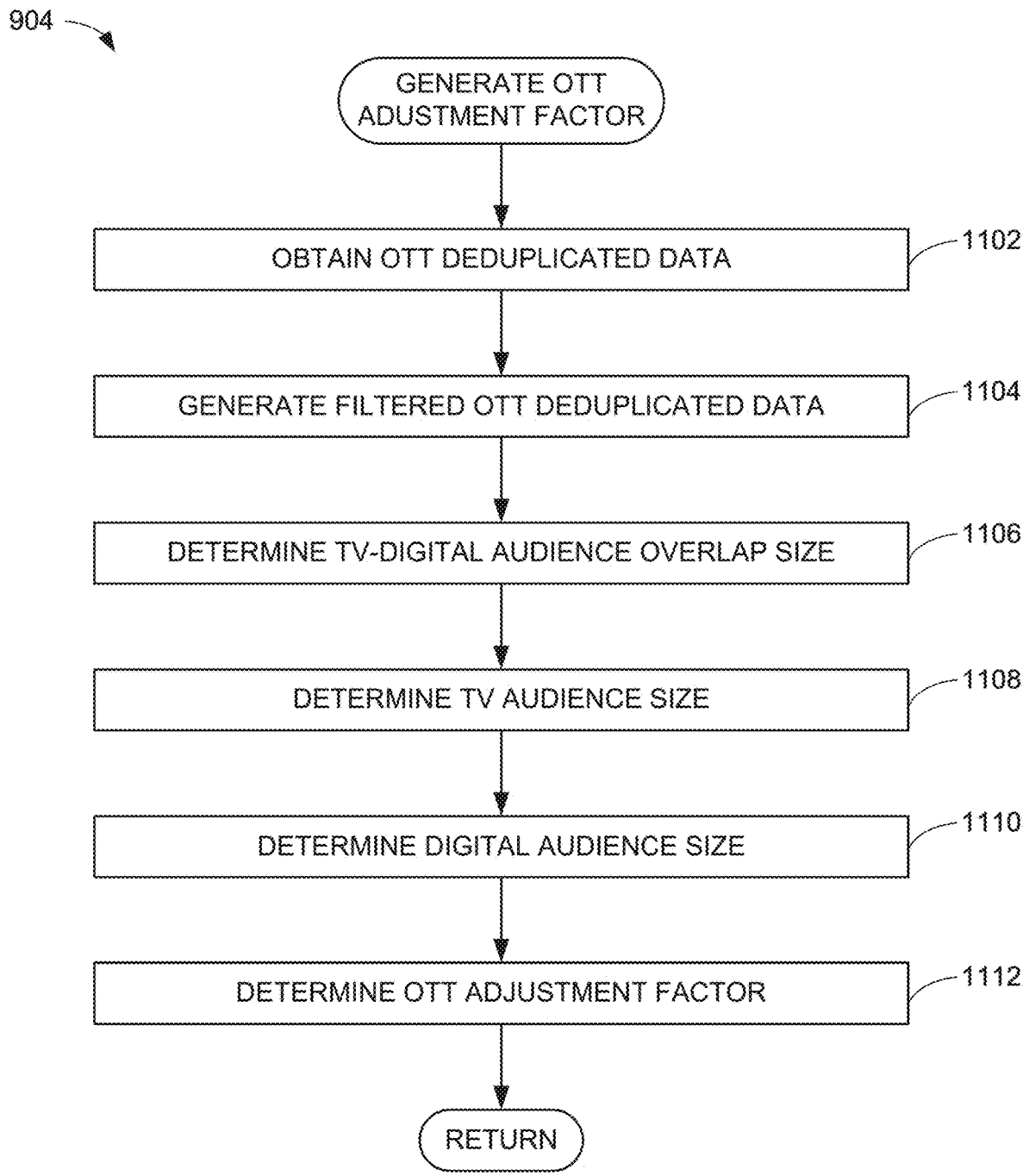
FIG. 11 is a flowchart representative of example machine readable instructions that may be executed by example processor circuitry to implement the example over-the-top factor generator circuitry of FIG. 3 to generate an OTT adjustment factor.

FIG. 11 is a flowchart representative of example machine readable instructions and/or operations 904 that may be executed and/or instantiated by processor circuitry to generate an OTT adjustment factor. The machine readable instructions and/or operations 904 of FIG. 11 may be used to implement block 904 of FIG. 9. The example instructions and/or operations 904 begin at block 1102, at which the example OTT factor generator circuitry 304 (FIG. 3) obtains OTT deduplicated data. For example, the OTT factor generator circuitry 304 obtains digital panel data stored in the digital panel database 204 (FIG. 2) and uses the digital panel data as the OTT deduplicated data. At block 1104, the example OTT factor generator circuitry 304 generates filtered OTT deduplicated data. For example, the OTT factor generator circuitry 304 filters the OTT deduplicated data based on a time period, a user age, a user gender, etc. so that the filtered OTT deduplicated data is pared down to more focused data pertaining to a selected one or more filter criteria such as time period, user age, user gender, etc.

At block 1106, the example OTT factor generator circuitry 304 determines the TV-digital audience overlap size. For example, the OTT factor generator circuitry 304 determines the TV-digital audience overlap size based on the TV panel data and the OTT deduplicated data. In some examples, the TV-digital audience overlap size represents a sum of panelist weights based on the TV panel data and the OTT deduplicated data. In some examples, the OTT factor generator circuitry 304 determines a sum of panelist weights that interacted with media on at least one panel type (e.g., TV panel data or the OTT deduplicated data) and on both panel types (e.g., TV panel data and the OTT deduplicated data). At block 1108, the example OTT factor generator circuitry 304 determines the TV audience size based on the TV panel data. In some examples, the OTT factor generator circuitry determine the TV audience size as the sum of panelist weights that include at least one interaction with media on a TV. At block 1110, the example OTT factor generator circuitry 304 determines the digital audience size based on the digital panel data. In some examples, the OTT factor generator circuitry 304 determines the digital audience size by determining the sum of panelist weights at demographic levels that were recorded in the TV panel data, the OTT deduplicated data, or overlapping between the TV panel data and OTT deduplicated data for some originators (e.g., TV networks). At block 1112, the example OTT factor generator circuitry 304 determines the OTT adjustment factor based on the TV-digital audience overlap size, the TV audience size, and the digital audience size. For example, the OTT adjustment factor represents an amount of duplication between the TV audience and the OTT audience. In some examples, the OTT factor generator circuitry 304 determines the OTT adjustment factor using example Equation 2 below.

$$\text{OTT adjustment factor} = \frac{UA_{TV} + UA_{OTT} - \text{overlap}}{UA_{TV} + UA_{OTT}} \quad \text{Equation 2}$$

In example Equation 2 above, $UA_{TV}$ is the TV universe audience size, $UA_{OTT}$ is the OTT universe audience size, and overlap is the overlapping audience size between TV and OTT (digital) on a demographic level. In example Equation 2 above, the OTT factor generator circuitry 304 determines a sum of the person weights of the TV audience size ($UA_{TV}$) and the person weights of the OTT audience size ($UA_{OTT}$) and the person weights of the overlapping audience size (overlap). In example Equation 2 above, the OTT factor generator circuitry 304 determines the average of the person weights at the demographic level. The example instructions 904 end and control returns to block 906 of FIG. 9.

FIG. 12 is a flowchart representative of example machine readable instructions and/or operations 906 that may be executed and/or instantiated by example processor circuitry to generate an independence probability adjustment factor. The machine readable instructions and/or operations 906 of FIG. 12 may be used to implement block 906 of FIG. 9. The example instructions and/or operations 906 of FIG. 12 begin at block 1202, at which the example independence probability factor generator circuitry 306 (FIG. 3) obtains television panel data and digital panel data. For example, the TV panel data includes viewing records attributed to the various originators (e.g., TV networks) and that are based on a household, a person ID, a demographic group, etc. and associated weights (e.g., household/person weights that need not be originator specific). In some examples, the digital panel data includes interaction records based on a household, a person ID, a demographic group, etc. attributed to media. In some examples, the digital panel data is aligned to the TV panel data. In some examples, the TV panel data and digital panel data represent how a household, a person ID, a demographic group, etc. interact with media types and if there are overlaps between media consumption types (e.g., TV and desktop).

At block 1204, the example independence probability factor generator circuitry 306 determines the TV audience probability, P(TV). For example, the independence probability factor generator circuitry 306 divides the TV audience size by the universe audience size estimate to generate the TV audience probability, P(TV). At block 1206, the example independence probability factor generator circuitry 306 determines the digital audience probability, P(DCR). For example, the independence probability factor generator circuitry 306 divides the digital panel audience size by the universe audience size estimate to generate the digital audience probability, P(DCR). At block 1208, the example independence probability factor generator circuitry 306 determines the independence probability adjustment factor. For example, the independence probability factor generator circuitry 306 generates the independence probability adjustment factor based on example Equation 1 above. The example instructions 906 end and control returns to block 908 of FIG. 9.

FIG. 13 is a block diagram of an example processor platform 1300 structured to execute and/or instantiate the machine readable instructions and/or operations of FIGS. 9-12 to implement the audience metrics generator circuitry 112 of FIGS. 1, 2, and/or 3. The processor platform 1300 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example OP factor generator circuitry 302, the example OTT factor generator circuitry 304, the example independence probability factor generator circuitry 306, the example modular factor generator circuitry 308, and the example convergence circuitry 310.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1332, which may be implemented by the machine readable instructions of FIGS. 9-12, may be stored in the mass storage device 1328, in the volatile memory 1314, in the non-volatile memory 1316, and/or on a removable non-transitory computer readable storage medium such as a CD or DVD. In this example, the mass storage 1328 implements the example training data database 312.

FIG. 14 is a block diagram of an example implementation of the processor circuitry 1312 of FIG. 13. In this example, the processor circuitry 1312 of FIG. 131 is implemented by a microprocessor 1400. For example, the microprocessor 1400 may implement multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 9-12.

The cores 1402 may communicate by an example bus 1404. In some examples, the bus 1404 may implement a communication bus to effectuate communication associated with one(s) of the cores 1402. For example, the bus 1404 may implement at least one of an Inter-Integrated Circuit (I2C) bus, a Serial Peripheral Interface (SPI) bus, a PCI bus, or a PCIe bus. Additionally or alternatively, the bus 1404 may implement any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2_cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the L1 cache 1420, and an example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The bus 1422 may implement at least one of an I2C bus, a SPI bus, a PCI bus, or a PCIe bus.

Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 15 is a block diagram of another example implementation of the processor circuitry 1312 of FIG. 13. In this example, the processor circuitry 1312 is implemented by FPGA circuitry 1500. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 9-12 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 9-12. In particular, the FPGA 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 9-12. As such, the FPGA circuitry 1500 may be structured to effectively instantiate some or all of the machine readable instructions of the flowcharts of FIGS. 9-12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIGS. 9-12 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware (e.g., external hardware circuitry) 1506. For example, the configuration circuitry 1504 may implement interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may implement the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and interconnections 1510 are configurable to instantiate one or more operations that may correspond to at least some of the machine readable instructions of FIGS. 9-12 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modem FPGA circuitry may include an on-board CPU, such as one or more of the example CPU 1520 of FIG. 15. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowcharts of FIGS. 9-12 may be executed by one or more of the cores 1402 of FIG. 14 and a second portion of the machine readable instructions represented by the flowcharts of FIGS. 9-12 may be executed by the FPGA circuitry 1500 of FIG. 15.

In some examples, the processor circuitry 1312 of FIG. 12 may be in one or more packages. For example, the processor circuitry 1400 of FIG. 14 and/or the FPGA circuitry 1500 of FIG. 15 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

Figure 16:
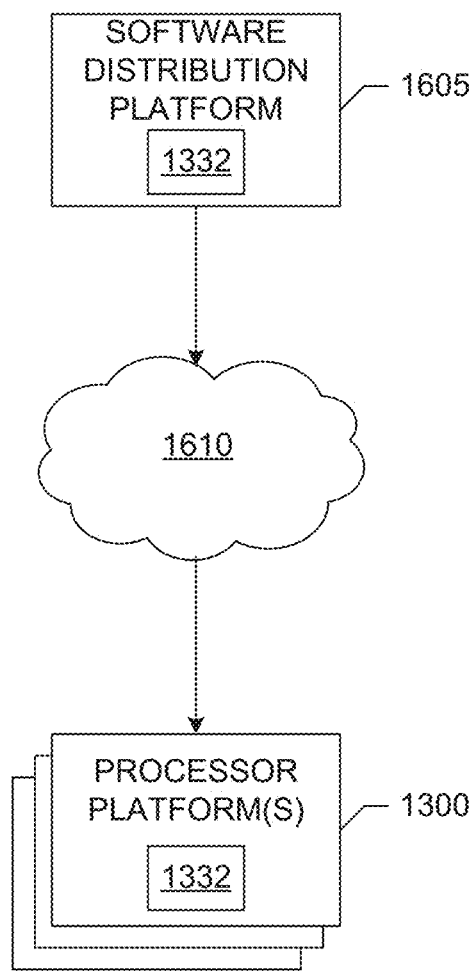
FIG. 16 is a block diagram of an example software distribution platform (e.g., one or more servers) to distribute software (e.g., software corresponding to the example machine readable instructions of FIGS. 9-12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1332 of FIG. 13 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1332, which may correspond to the example machine readable instructions of FIGS. 9-12, as described above. The one or more servers of the example software distribution platform 1605 are in communication with a network 1610, which may correspond to any one or more of the Internet and/or any of the example network 1326 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1605. For example, the software, which may correspond to the example machine readable instructions of FIGS. 9-12, may be downloaded to the example processor platform 1300, which is to execute the machine readable instructions 1332 to implement the example audience metrics generator circuitry 112. In some example, one or more servers of the software distribution platform 1605 periodically offer, transmit, and/or force updates to the software (e.g., the example machine readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed that deduplicate and estimate audience sizes. The disclosed systems, methods, apparatus, and articles of manufacture improve the efficiency of using a computing device by updating adjustment factors generated to estimate deduplicated reach. For example, the disclosed systems, methods, apparatus, and articles of manufacture determine whether new data is available and generates additional adjustment factors. Additionally or alternatively, the disclosed systems, methods, apparatus, and articles of manufacture remove the associated adjustment factor based on existing data (e.g., the existing data does not satisfy an accuracy threshold, the existing data is not within a selected time period, etc.). The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to generate audience metrics are disclosed herein. Further examples and combinations thereof include the following:

Example 1 includes an apparatus, comprising online panel factor generator circuitry to generate an online panel adjustment factor based on television panel data and online panel data, over-the-top (OTT) factor generator circuitry to generate an OTT adjustment factor based on the television panel data and a portion of the online panel data, the portion of the online panel data corresponding to OTT panel data, independence probability factor generator circuitry to generate an independence probability adjustment factor, and a convergence circuitry to generate an aggregated adjustment factor based on the online panel adjustment factor, the OTT adjustment factor, and the independence probability adjustment factor, and generate a deduplicated reach corresponding to a media item based on a comparison of the aggregated adjustment factor to historical data.

Example 2 includes the apparatus of example 1, wherein the convergence circuitry is to generate the aggregated adjustment factor based on at least one of an Internet protocol (IP) match factor, a maximum entropy factor, or an identity factor.

Example 3 includes the apparatus of example 1, wherein the online panel data includes desktop panel data and mobile panel data.

Example 4 includes the apparatus of example 3, wherein the online panel factor generator circuitry is to identify a first overlap between a first audience represented in the television panel data and a second audience represented in the desktop panel data, and identify a second overlap between a third audience represented in the television panel data and a fourth audience represented in the mobile panel data.

Example 5 includes the apparatus of example 4, wherein the online panel factor generator circuitry is to generate the online panel adjustment factor based on the first overlap and the second overlap.

Example 6 includes the apparatus of example 1, wherein the OTT factor generator circuitry is to filter the OTT panel data based on at least one of age, gender, a short-term visitor indicator, or a primary household indicator.

Example 7 includes the apparatus of example 1, wherein the independence probability factor generator circuitry is to generate the independence probability adjustment factor based on a television audience probability and a digital audience probability.

Example 8 includes a non-transitory computer readable storage medium comprising instructions that, when executed, cause at least one processor to at least generate an online panel adjustment factor based on television panel data and online panel data, generate an over-the-top (OTT) adjustment factor based on the television panel data and a portion of the online panel data, the portion of the online panel data corresponding to OTT panel data, generate an independence probability adjustment factor, generate an aggregated adjustment factor based on the online panel adjustment factor, the OTT adjustment factor, and the independence probability adjustment factor, and generate a deduplicated reach corresponding to a media item based on a comparison of the aggregated adjustment factor to historical data.

Example 9 includes the non-transitory computer readable storage medium of example 8, wherein the instructions are further to cause the at least one processor to generate the aggregated adjustment factor based on at least one of an Internet protocol (IP) match factor, a maximum entropy factor, or an identity factor.

Example 10 includes the non-transitory computer readable storage medium of example 8, wherein the online panel data includes desktop panel data and mobile panel data.

Example 11 includes the non-transitory computer readable storage medium of example 10, wherein the instructions are further to cause the at least one processor to identify a first overlap between a first audience represented in the television panel data and a second audience represented in the desktop panel data, and identify a second overlap between a third audience represented in the television panel data and a fourth audience represented in the mobile panel data.

Example 12 includes the non-transitory computer readable storage medium of example 11, wherein the instructions are further to cause the at least one processor to generate the online panel adjustment factor based on the first overlap and the second overlap.

Example 13 includes the non-transitory computer readable storage medium of example 8, wherein the instructions are further to cause the at least one processor to filter the OTT panel data based on at least one of age, gender, a short-term visitor indicator, or a primary household indicator.

Example 14 includes the non-transitory computer readable storage medium of example 8, wherein the instructions are further to cause the at least one processor to generate the independence probability adjustment factor based on a television audience probability and a digital audience probability.

Example 15 includes a method comprising generating, by executing an instruction with a processor, an online panel adjustment factor based on television panel data and online panel data, generating, by executing an instruction with the processor, an over-the-top (OTT) adjustment factor based on the television panel data and a portion of the online panel data, the portion of the online panel data corresponding to OTT panel data, generating, by executing an instruction with the processor, an independence probability adjustment factor, generating, by executing an instruction with the processor, an aggregated adjustment factor based on the online panel adjustment factor, the OTT adjustment factor, and the independence probability adjustment factor, and generating, by executing an instruction with the processor, a deduplicated reach corresponding to a media item based on a comparison of the aggregated adjustment factor to historical data.

Example 16 includes the method of example 15, further including generating the aggregated adjustment factor based on at least one of an Internet protocol (IP) match factor, a maximum entropy factor, or an identity factor.

Example 17 includes the method of example 15, wherein the online panel data includes desktop panel data and mobile panel data.

Example 18 includes the method of example 17, further including identifying a first overlap between a first audience represented in the television panel data and a second audience represented in the desktop panel data, and identifying a second overlap between a third audience represented in the television panel data and a fourth audience represented in the mobile panel data.

Example 19 includes the method of example 18, further including generating the online panel adjustment factor based on the first overlap and the second overlap.

Example 20 includes the method of example 15, further including filtering the OTT panel data based on at least one of age, gender, a short-term visitor indicator, or a primary household indicator.

Example 21 includes the method of example 15, further including generating the independence probability adjustment factor based on a television audience probability and a digital audience probability.

Example 22 includes an apparatus comprising at least one memory, instructions in the apparatus, and processor circuitry to execute the instructions to generate an online panel adjustment factor based on television panel data and online panel data, generate an over-the-top (OTT) adjustment factor based on the television panel data and a portion of the online panel data, the portion of the online panel data corresponding to OTT panel data, generate an independence probability adjustment factor, generate an aggregated adjustment factor based on the online panel adjustment factor, the OTT adjustment factor, and the independence probability adjustment factor, and generate a deduplicated reach corresponding to a media item based on a comparison of the aggregated adjustment factor to historical data.

Example 23 includes the apparatus of example 22, wherein the processor circuitry is to generate the aggregated adjustment factor based on at least one of an Internet protocol (IP) match factor, a maximum entropy factor, or an identity factor.

Example 24 includes the apparatus of example 22, wherein the online panel data includes desktop panel data and mobile panel data.

Example 25 includes the apparatus of example 24, wherein the processor circuitry is to identify a first overlap between a first audience represented in the television panel data and a second audience represented in the desktop panel data, and identify a second overlap between a third audience represented in the television panel data and a fourth audience represented in the mobile panel data.

Example 26 includes the apparatus of example 25, wherein the processor circuitry is to generate the online panel adjustment factor based on the first overlap and the second overlap.

Example 27 includes the apparatus of example 22, wherein the processor circuitry is to filter the OTT panel data based on at least one of age, gender, a short-term visitor indicator, or a primary household indicator.

Example 28 includes the apparatus of example 22, wherein the processor circuitry is to generate the independence probability adjustment factor based on a television audience probability and a digital audience probability.

Example 29 includes an apparatus comprising at least one memory, and processor circuitry including one or more of at least one of a central processor unit, a graphic processor unit or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry including logic gate circuitry to perform one or more third operations, the processor circuitry to at least one of perform at least one of the first operations, the second operations or the third operations to generate an online panel adjustment factor based on television panel data and online panel data, generate an over-the-top (OTT) adjustment factor based on the television panel data and a portion of the online panel data, the portion of the online panel data corresponding to OTT panel data, generate an independence probability adjustment factor, generate an aggregated adjustment factor based on the online panel adjustment factor, the OTT adjustment factor, and the independence probability adjustment factor, and generate a deduplicated reach corresponding to a media item based on a comparison of the aggregated adjustment factor to historical data.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus, comprising:
    online panel factor generator circuitry to generate an online panel adjustment factor based on television panel data and digital panel data obtained from an Internet-connectable over-the-top device;
    over-the-top (OTT) factor generator circuitry to generate an OTT adjustment factor based on the television panel data and a portion of the digital panel data, the portion of the digital panel data corresponding to OTT panel data obtained from Internet-connectable over-the-top devices including the Internet-connectable over-the-top device, the OTT adjustment factor representative of an amount of duplication of impressions among a television audience represented in the television panel data and a digital audience represented in the digital panel data;
    independence probability factor generator circuitry to generate an independence probability adjustment factor corresponding to a combination of a television audience probability and a digital audience probability, the combination representative of the television audience, the digital audience, and an audience overlap from the television audience represented in the television panel data and the digital audience represented in the digital panel data; and
    a convergence circuitry to:
        generate an aggregated adjustment factor based on the online panel adjustment factor, the OTT adjustment factor, and the independence probability adjustment factor; and
        generate a deduplicated reach corresponding to a media item based on a comparison of the aggregated adjustment factor to historical data.

2. The apparatus of claim 1, wherein the convergence circuitry is to generate the aggregated adjustment factor based on at least one of an Internet protocol (IP) match factor, a maximum entropy factor, or an identity factor.

3. The apparatus of claim 1, wherein the digital panel data further includes desktop panel data and mobile panel data obtained from a desktop computer device or a mobile device.

4. The apparatus of claim 3, wherein the online panel factor generator circuitry is to:
    identify a first overlap between a first audience represented in the television panel data and a second audience represented in the desktop panel data; and
    identify a second overlap between a third audience represented in the television panel data and a fourth audience represented in the mobile panel data.

5. The apparatus of claim 4, wherein the online panel factor generator circuitry is to generate the online panel adjustment factor based on the first overlap and the second overlap.

6. The apparatus of claim 1, wherein the OTT factor generator circuitry is to filter the OTT panel data based on at least one of age, gender, a short-term visitor indicator, or a primary household indicator.

7. A non-transitory computer readable storage medium comprising
    instructions that, when executed, cause at least one processor to at least:
        generate an online panel adjustment factor based on television panel data and digital panel data obtained from an Internet-connectable over-the-top device;
        generate an over-the-top (OTT) adjustment factor based on the television panel data and a portion of the digital panel data, the portion of the digital panel data corresponding to OTT panel data obtained from Internet-connectable over-the-top devices including the Internet-connectable over-the-top device, the OTT adjustment factor representative of an amount of duplication of impressions among a television audience represented in the television panel data and a digital audience represented in the digital panel data;
        generate an independence probability adjustment factor corresponding to a combination of a television audience probability and a digital audience probability, the combination representative of the television audience, the digital audience, and an audience overlap from the television audience represented in the television panel data and the digital audience represented in the digital panel data;
        generate an aggregated adjustment factor based on the online panel adjustment factor, the OTT adjustment factor, and the independence probability adjustment factor; and
        generate a deduplicated reach corresponding to a media item based on a comparison of the aggregated adjustment factor to historical data.

8. The non-transitory computer readable storage medium of claim 7, wherein the instructions are further to cause the at least one processor to generate the aggregated adjustment factor based on at least one of an Internet protocol (IP) match factor, a maximum entropy factor, or an identity factor.

9. The non-transitory computer readable storage medium of claim 7, wherein the digital panel data further includes desktop panel data and mobile panel data obtained from a desktop computer device or a mobile device.

10. The non-transitory computer readable storage medium of claim 9, wherein the instructions are further to cause the at least one processor to:

identify a first overlap between a first audience represented in the television panel data and a second audience represented in the desktop panel data; and identify a second overlap between a third audience represented in the television panel data and a fourth audience represented in the mobile panel data.

11. The non-transitory computer readable storage medium of claim 10, wherein the instructions are further to cause the at least one processor to generate the online panel adjustment factor based on the first overlap and the second overlap.

12. The non-transitory computer readable storage medium of claim 7, wherein the instructions are further to cause the at least one processor to filter the OTT panel data based on at least one of age, gender, a short-term visitor indicator, or a primary household indicator.

13. A method comprising:
obtaining digital panel data from an Internet-connectable over-the-top device;
generating, by executing an instruction with a processor, an online panel adjustment factor based on television panel data and the digital panel data;
generating, by executing an instruction with the processor, an over-the-top (OTT) adjustment factor based on the television panel data and a portion of the digital panel data, the portion of the digital panel data corresponding to OTT panel data obtained from Internet-connectable over-the-top devices including the Internet-connectable over-the-top device, the OTT adjustment factor representative of an amount of duplication of impressions amount a television audience represented in the television panel data and a digital audience represented in the digital panel data;
generating, by executing an instruction with the processor, an independence probability adjustment factor corresponding to a combination of a television audience probability and a digital audience probability, the combination representative of the television audience, the digital audience, and an audience overlap from the television audience represented in the television panel data and the digital audience represented in the digital panel data;
generating, by executing an instruction with the processor, an aggregated adjustment factor based on the online panel adjustment factor, the OTT adjustment factor, and the independence probability adjustment factor; and
generating, by executing an instruction with the processor, a deduplicated reach corresponding to a media item based on a comparison of the aggregated adjustment factor to historical data.

14. The method of claim 13, further including generating the aggregated adjustment factor based on at least one of an Internet protocol (IP) match factor, a maximum entropy factor, or an identity factor.

15. The method of claim 13, wherein the digital panel data further includes desktop panel data and mobile panel data obtained from a desktop computer device or a mobile device.

16. The method of claim 15, further including:
identifying a first overlap between a first audience represented in the television panel data and a second audience represented in the desktop panel data; and
identifying a second overlap between a third audience represented in the television panel data and a fourth audience represented in the mobile panel data.

17. The method of claim 16, further including generating the online panel adjustment factor based on the first overlap and the second overlap.

18. The apparatus of claim 1, wherein the audience overlap corresponds to matches of panelist IDs from among the television panel data and the digital panel data.

19. The non-transitory computer readable storage medium of claim 7, wherein the audience overlap corresponds to matches of panelist IDs from among the television panel data and the digital panel data.

20. The method of claim 13, wherein the audience overlap corresponds to matches of panelist IDs from among the television panel data and the digital panel data.

* * * * *